(12) United States Patent
Denton

(10) Patent No.: US 11,544,036 B2
(45) Date of Patent: Jan. 3, 2023

(54) MULTI-FREQUENCY SENSING SYSTEM WITH IMPROVED SMART GLASSES AND DEVICES

(71) Applicant: ZOPHONOS INC., Dover, DE (US)

(72) Inventor: Levaughn Denton, Baisley Park, NY (US)

(73) Assignee: ZOPHONOS INC., Dover, DE (US)

( * ) Notice: Subject to any disclaimer, the term of this patent is extended or adjusted under 35 U.S.C. 154(b) by 0 days.

(21) Appl. No.: 17/106,496

(22) Filed: Nov. 30, 2020

(65) Prior Publication Data
US 2021/0157544 A1 May 27, 2021

Related U.S. Application Data

(63) Continuation-in-part of application No. 16/847,101, filed on Apr. 13, 2020, now Pat. No. 11,150,868, (Continued)

(51) Int. Cl.
*H04R 29/00* (2006.01)
*H04R 27/00* (2006.01)
(Continued)

(52) U.S. Cl.
CPC .......... *G06F 3/165* (2013.01); *H04R 27/00* (2013.01); *H04B 1/0003* (2013.01); *H04L 67/12* (2013.01);
(Continued)

(58) Field of Classification Search
CPC .......... H04R 1/10; H04R 1/1091; H04R 3/00; H04R 3/02; H04R 3/04; H04R 3/12;
(Continued)

(56) References Cited

U.S. PATENT DOCUMENTS

| 5,668,884 A | 9/1997 | Clair, Jr. et al. |
| 7,352,871 B1 * | 4/2008 | Mozo .................. H04R 1/1008 381/74 |

(Continued)

FOREIGN PATENT DOCUMENTS

| EP | 1971035 A1 | 9/2008 |
| KR | 101816041 B1 | 1/2018 |

(Continued)

OTHER PUBLICATIONS

International Search Report, dated Jan. 29, 2019, for PCT Application No. PCT/US15/51638, International Filing date of Sep. 23, 2015, consisting of 2 pages.
(Continued)

*Primary Examiner* — Thang V Tran
(74) *Attorney, Agent, or Firm* — Gearhart Law LLC; David Postolski

(57) ABSTRACT

The systems and methods described relate to the concept that smart devices can be used to: sense various types of phenomena like sound, blue light exposure, RF and microwave radiation, and, in real-time, analyze, report and/or control outputs (e.g., displays or speakers). The systems are configurable and use standard computing devices, such as wearable electronics (e.g., smart glasses), tablet computers, and mobile phones to measure various frequency bands across multiple points, allowing a single user to visualize and/or adjust environmental conditions.

21 Claims, 22 Drawing Sheets

Related U.S. Application Data which is a continuation-in-part of application No. 16/421,141, filed on May 23, 2019, now Pat. No. 10,656,906, which is a continuation-in-part of application No. 16/155,919, filed on Oct. 10, 2018, now abandoned, which is a continuation of application No. 14/862,304, filed on Sep. 23, 2015, now Pat. No. 10,127,005.

(60) Provisional application No. 62/054,286, filed on Sep. 23, 2014.

(51) Int. Cl.
  *G06F 3/16* (2006.01)
  *H04L 67/12* (2022.01)
  *H04B 1/00* (2006.01)
  *H04S 7/00* (2006.01)

(52) U.S. Cl.
  CPC ...... *H04R 29/007* (2013.01); *H04R 2227/003* (2013.01); *H04R 2499/13* (2013.01); *H04S 7/40* (2013.01); *H04S 2400/15* (2013.01)

(58) Field of Classification Search
  CPC ...... H04R 27/00; H04R 29/00; H04R 29/001; H04R 29/007; H04R 2227/001; H04R 2227/003; H04R 2420/07; H04R 2430/03; H04R 2499/13; H04S 7/40; H04S 2400/15; G06F 3/16; G06F 3/165; H04L 67/12
  See application file for complete search history.

(56) References Cited

U.S. PATENT DOCUMENTS

| | | |
|---|---|---|
| 7,991,171 B1 | 8/2011 | Snow |
| 8,073,160 B1 | 12/2011 | Classen |
| 8,315,398 B2 | 11/2012 | Katsianos |
| 8,452,432 B2 | 5/2013 | Transeau |
| 8,594,319 B2 | 11/2013 | Ho et al. |
| 8,645,993 B2 | 2/2014 | Perry |
| 9,955,286 B2 | 4/2018 | Segal |
| 10,127,005 B2 | 11/2018 | Denton |
| 10,656,906 B2 | 5/2020 | Denton |
| 10,848,891 B2 * | 11/2020 | Khaleghimeybodi . H04R 1/406 |
| 2004/0076305 A1 | 4/2004 | Santiago |
| 2004/0240676 A1 | 12/2004 | Hashimoto et al. |
| 2005/0160270 A1 | 7/2005 | Goldberg et al. |
| 2006/0067550 A1 | 3/2006 | Puder et al. |
| 2006/0082458 A1 | 4/2006 | Shanks et al. |
| 2007/0217623 A1 | 9/2007 | Harada |
| 2009/0003620 A1 | 1/2009 | McKillop et al. |
| 2009/0058611 A1 | 3/2009 | Kawamura et al. |
| 2009/0076825 A1 | 3/2009 | Bradford et al. |
| 2010/0329471 A1 | 12/2010 | Dunn et al. |
| 2011/0134278 A1 | 6/2011 | Chang et al. |
| 2011/0313555 A1 | 12/2011 | Shoham et al. |
| 2012/0029383 A1 * | 2/2012 | Henriksen ............... A61F 11/08 600/559 |
| 2012/0189140 A1 | 7/2012 | Hughes |
| 2013/0044131 A1 | 2/2013 | Milad |
| 2013/0064380 A1 | 3/2013 | Mahowald |
| 2013/0294618 A1 | 11/2013 | Lyubachev |
| 2015/0281853 A1 | 10/2015 | Eisner et al. |
| 2015/0326965 A1 * | 11/2015 | Sprague ............... H04R 25/405 381/317 |
| 2015/0358730 A1 | 12/2015 | Kirsch et al. |
| 2016/0150338 A1 | 5/2016 | Kim et al. |
| 2016/0299569 A1 | 10/2016 | Fisher et al. |
| 2017/0263236 A1 * | 9/2017 | Boesen ................... A61F 11/08 |

FOREIGN PATENT DOCUMENTS

| | | |
|---|---|---|
| WO | 2016049130 A1 | 3/2016 |
| WO | 2016180285 A1 | 11/2016 |

OTHER PUBLICATIONS

International Preliminary Report on Patentability, dated Mar. 28, 2017, for PCT Application No. PCT/US15/51638, International Filing date of Sep. 23, 2015, consisting of 7 pages.

Written Opinion of the International Searching Authority, dated Jan. 29, 2016, for PCT Application No. PCT/US15/51638, International Filing date of Sep. 23, 2015, consisting of 6 pages.

International Search Report dated Sep. 16, 2020 issued in PCT/US2020/042927.

* cited by examiner

MULTI-FREQUENCY SENSING SYSTEM WITH IMPROVED SMART GLASSES AND DEVICES

CLAIM OF PRIORITY

This application is a U.S. Continuation-In-Part Patent Application of U.S. Non-Provisional patent application Ser. No. 16/847,101 filed on Apr. 13, 2020, which is a U.S. Continuation-In-Part Patent Application of U.S. Non-Provisional patent application Ser. No. 16/421,141 filed on May 23, 2019, which is a U.S. Continuation-In-Part Patent Application of U.S. Non-Provisional patent application Ser. No. 16/155,919, filed Oct. 10, 2018, which is a Continuation of U.S. Non-Provisional patent application Ser. No. 14/862,304, filed Sep. 23, 2015, which claims priority from U.S. Patent Provisional Application No. 62/054,286, filed on Sep. 23, 2014, the contents of which are hereby fully incorporated by reference.

FIELD OF THE EMBODIMENTS

The invention and its embodiments relate to audio manipulation and sound management systems, particularly for home audio systems, public address systems, sound reinforcement systems, vehicle audio systems, ultrasonic transducers, infrasonic transducers, electro-optical transducers, wearable devices (e.g., smart glasses), microwave transducers, and associated software for these applications.

BACKGROUND OF THE EMBODIMENTS

Each year sound companies spend billions of dollars on audio technologies and audio research to find new ways to improve audio quality in performance settings. Very often sound systems are designed to be used in a specific environment. For example, in a vehicle or private room setting, audio manipulation and output quality techniques and technologies are either prescriptive or adaptive—neither of which require the need for audio engineering professionals. However, in other situations such as at a concert venue, a wide array of audio professionals must be employed. This can include monitor engineers, system technicians, and front-of-house engineers. These professionals operate mixing consoles and audio control units to produce desirable, high-quality audio output.

Whether prescriptive or adaptive, manned or unmanned, perceived sound quality is a function of complex transducer-based technologies and acoustic treatment that are typically controlled, managed and manipulated by humans, and/or audio software and hardware. As such, both human and physical capital are required to produce first-rate sound quality. However, even when the necessary human and capital has been spent, it can still be very difficult to effectively manage audio outputs in real-time. This is due to improper calibrations of signal propagation and signal degradation, as well as unwanted harmonics and soundwave reflections.

Particularly in an outdoor setting, single-source sound systems typically produce an intermittent mix of unintelligible sounds and echoes due to a given venue's size and openness. A popular solution for addressing the echo issue is to utilize distributed sound systems. Traditional distributed sound systems are less susceptible to sound variance than single source systems. However, even when these distributed systems are used, temperature gradients and wind can still steer sound in undesirable ways.

Another issue related to the size of a performance venue is when audio and video fall out of sync. As live musical performances become more and more elaborate by including digital art and screens on-stage, it is becoming increasingly difficult to reliably sync audio and video in large venues, due to highly reverberant surfaces and long decay times.

Also impacting audio intelligibility during a live performance is crowd noise. At a live event, it is not uncommon for crowds to generate noise approaching 105 dB. When this occurs, audio engineers must manipulate the supporting sound system output so that the performance audio remains 5-8 decibels higher than the noise generated by crowd. This action results in performance sound being broadcast above 110 dB, the range where the volume of sound begins to pose danger to human listeners. Frequently, audio system operators find it difficult to granularly control the loud perception of a given individual listener while managing loudness perception for the remainder of the audience. In a case where an audio quality trade-off decision has to be made, a common industry practice is to execute a remediation plan that favors the majority of listeners while the minority of listeners are forced to suffer through it.

In other instances, when various pieces of audio equipment are slightly, or completely out-of-phase, it can be difficult for audio system operators to correct these out-of-phase issues in a short period of time.

A myriad of audio functions are necessary to provide a dynamic range of audio playback and fidelity. To meet heightened demands and address new challenges, the devices of today will not only have to handle traditional telephony voice communication and low-fidelity voice recording, but also, these devices must be capable of incorporating new hardware and software to create new functions and applications such as sensing infrasonic, ultrasonic, blue light and millimeter wave exposure and reporting, and in some cases, autonomous manipulation of audio outputs. Further, such demands create the need to process signals using 'low-loss' methods by moving much of the processing function away from hardware and into software optimized to do so.

Further, very often, the general public associates hearing loss with loudness or volume but leaves little regard to pitch or frequency. Conductive, sensorineural, and mixed hearing loss (the three basic types of hearing loss) are all extremely complex medical issues, and with each condition, loudness is only one of many contributory factors. For example, high-pitched sounds may damage the auditory nerve and hair cells in the inner ear, which can result in sensorineural hearing loss, a type of hearing loss that cannot be 'corrected' using a hearing aid device. Understanding that there are limited treatment options for many of the issues described (e.g. 'profound' sensorineural hearing loss that has no cure), one function of this invention—and all related patents—is to use smart devices to mimic the way humans experience auditory, optical, and RF events in their respective micro and macro environments (clusters) in order to highlight dangers (when necessary), and provide preventative and customizable solutions.

Review of Related Technology

Line6, Inc. has created a 'smart mixing system' for non-wearable ubiquitous computing devices that enables wireless and touchscreen control of live sound system components. This is accomplished via a wired connection between standard audio hardware and a proprietary physical interface. While this system integrates and controls live sound system components via touchscreen devices, it unfortunately relies on audio engineers to operate it, and does not incorporate a listener-centric way to autonomously solve audio issues experienced by an audience.

U.S. Pat. No. 5,668,884 pertains to an audio enhancement system and method of use with a sound system for producing primary sound from at least one main loudspeaker located at a main position. The audio enhancement system comprises at least one wireless transmitter, time delay circuitry, and plural augmented sound producing subsystems. Each sound subsystem is a portable unit arranged to be carried by a person located remote from the main loudspeaker and includes a wireless receiver and an associated transducer device, e.g., a pair of stereo headphones. The transmitter broadcasts an electrical signal which is representative of the electrical input signal provided to the main loudspeaker. The broadcast signal is received by the receiver and is demodulated and amplified to drive the transducer so that it produces augmented sound substantially in synchronism with the sound arriving from the main loudspeaker. To achieve that end the time delay circuitry delays the electrical signal which is provided to the transducer for a predetermined period of time corresponding generally to the time period it takes for the primary sound to propagate through the air from the main loudspeaker to the remote location at which the person is located.

U.S. Pat. No. 7,991,171 pertains to a method and apparatus for processing an audio signal in multiple audio frequency bands while minimizing undesirable changes in tonal qualities of the audio signal by determining an initial gain adjustment factor for each audio frequency band resulting from the application of an audio processing technique. A final gain adjustment factor for each band is selected from a corresponding set of weighted or unweighted initial gain adjustment factors. The set of initial gain adjustment factors from which the final gain adjustment factor for a specified audio frequency band is obtained is derived from other audio frequency bands that have the frequency of the specified band as a harmonic frequency. Changes in audio signal level within one audio frequency band thereby affect the signal level of harmonic frequencies to decrease relative changes in volume between a fundamental frequency and its harmonics.

U.S. Pat. No. 8,315,398 pertains to a method of adjusting a loudness of an audio signal may include receiving an electronic audio signal and using one or more processors to process at least one channel of the audio signal to determine a loudness of a portion of the audio signal. This processing may include processing the channel with a plurality of approximation filters that can approximate a plurality of auditory filters that further approximate a human hearing system. In addition, the method may include computing at least one gain based at least in part on the determined loudness to cause a loudness of the audio signal to remain substantially constant for a period of time. Moreover, the method may include applying the gain to the electronic audio signal.

U.S. Pat. No. 8,452,432 pertains to a user-friendly system for real time performance and user modification of one or more previously recorded musical compositions facilitates user involvement in the creative process of a new composition that reflects the user's personal style and musical tastes. Such a system may be implemented in a small portable electronic device such as a handheld smartphone that includes a stored library of musical material including original and alternative versions of each of several different components of a common original musical composition, and a graphic user interface that allows the user to select at different times while that original composition is being performed, which versions of which components are to be incorporated to thereby create in real time a new performance that includes elements of the original performance, preferably enhanced at various times with user selected digital sound effects including stuttering and filtering. The system may also optionally comprise a visualizer module that renders a visual animation that is responsive to at least the rhythm and amplitude of the system's audio output, not only for entertainment value but also to provide visual feedback for the user.

U.S. Pat. No. 8,594,319 pertains to methods and apparatuses for adjusting audio content when more multiple audio objects are directed toward a single audio output device. The amplitude, white noise content, and frequencies can be adjusted to enhance overall sound quality or make content of certain audio objects more intelligible. Audio objects are classified by a class category, by which they can be assigned class specific processing. Audio objects classes can also have a rank. The rank of an audio object's class is used to give priority to or apply specific processing to audio objects in the presence of other audio objects of different classes.

United States Patent Publication No. 2007/0217623 pertains to a real-time processing apparatus capable of controlling power consumption without performing complex arithmetic processing and requiring a special memory resource. The real-time processing apparatus includes an audio encoder that performs a signal processing in real time on an audio signal, a second audio encoder that performs the signal processing with a smaller throughput in real time on the audio, an audio execution step number notification unit that measures step number showing a level of the throughput in the signal processing by operating the 1st audio encoder or second audio encoder, and an audio visual system control unit that executes control so that the first audio encoder operates when the measured step number is less than a threshold value provided beforehand and the second audio encoder operates when the step number is equal to or greater than the threshold value.

United States Patent Publication No. 2011/0134278 pertains to an image/audio data sensing module incorporated in a case of an electronic apparatus. The image/audio data sensing module comprises: at least one image sensor, for sensing an image datum; a plurality of audio sensors, for sensing at least one audio datum; a processor, for processing the image datum and the audio datum according to a control instruction set to generate a processed image data stream and at least one processed audio data stream, and combining the processed image data stream and the processed audio data stream to generate an output data stream following a transceiver interface standard; a transceiver interface, for receiving the control instruction set and transmitting the output data stream via a multiplexing process; and a circuit board, wherein the image sensor, the audio sensors and the transceiver interface are coupled to the circuit board, and the processor is provided on the circuit board.

United States Patent Publication No. 2013/0044131 pertains to a method for revealing changes in settings of an analog control console, the method comprising: receiving a captured image of the analog control console; creating a composite image by superimposing the captured image and a live image of the analog control console; and displaying the composite image.

United States Patent Publication No. 2013/0294618 pertains to a method and devices of sound volume management and control in the attended areas. According to the proposed method and system variants the sound reproducing system comprises: sounding mode appointment device, central station for audio signal transmittance; one or more peripheral stations for audio signal reception and playback; appliance for listener's location recognition; computing device for performing calculation concerning sounding parameters at the points of each listener's location and for performing calculation of controlling parameters for system tuning. The system can be operated wirelessly and can compose a local network.

WO 2016/180285 describes a wearable apparatus (e.g., a pair of smart glasses). The smart glasses comprise a glasses body composed of a glasses frame and lenses, and also comprise an image acquisition device which is arranged on the glasses body and used for acquiring an environment image. The smart glasses also include a detection device which is in communication connection with the image acquisition device. The detection device acquires the environment image and detects and extracts a human face image or/and a foreign language image. The smart glasses further include a recognition device which is in communication connection with the detection device and used for recognizing the human face image or/and the foreign language image, so as to acquire identity information and native language information. The smart glasses also include an information output device which plays the identity information, the native language information, the identity information or/and the native language information and at least one of the following to a user: the human face image; the foreign language image; and the environment image.

KR 101816041 relates to smart glasses for storing a 3D model of a target object.

U.S. Pat. No. 9,955,286 describes a system for remote control of wearable computers. The wearable computers may include smart glasses, augmented reality glasses, smart lenses, smart rings, and mobile devices.

United States Published Patent Application No. 2016/0299569 describes a pair of eyeglasses that has a frame and lenses mounted on the frame. A computer processor is mounted on eyeglasses together with a plurality of cameras and a digital projection system. IR sensors and/or dual zoom cameras may also be mounted on the glasses and configured to track the movement of the user's hand.

Various devices are known in the art. However, their structure and means of operation are substantially different from the present invention. The invention and its embodiments relate to audio manipulation and sound management systems, particularly for home audio systems, public address systems, sound reinforcement systems, vehicle audio systems, ultrasonic transducers, infrasonic transducers, electro-optical transducers, wearable devices (e.g., smart glasses), microwave transducers, and associated software for these applications.

SUMMARY OF THE EMBODIMENTS

The present invention and its embodiments relate to audio manipulation and sound management systems, particularly for home audio systems, public address systems, sound reinforcement systems, vehicle audio systems, ultrasonic transducers, infrasonic transducers, electro-optical transducers, wearable devices (e.g., smart glasses), microwave transducers, and associated software for these applications.

A first embodiment of the present invention provides a system. The system includes an audio control source, or other data source capable of processing sound fingerprint data, RF or optical data, or the like, and at least one cluster of at least one computing device. The at least one computing device includes a sound sensing mechanism configured to sense a noise and a wireless transceiver or wired data bus configured to transmit and receive data from the data source. The sound-sensing mechanism includes an omnidirectional transducer, an ultrasonic transducer, an infrasonic transducer, or a microwave transducer, among other devices. The sensed noise includes infrasonic or ultrasonic soundwaves.

The system also includes an in-ear device. In some examples, an audio output of the in-ear device may be configured to auto-adjust based on signal energy sensed within a cluster of the at least one cluster or surrounding clusters of the at least one cluster. In other examples, the audio output of the in-ear device may be configured to manually adjust (e.g., is in a non-auto-adjust mode) based on the signal energy sensed within the cluster of the at least one cluster or the surrounding clusters of the at least one cluster.

Moreover, in some examples, a mobile cluster-based audio adjusting method and apparatus may be integrated with existing audio hardware and software—such as the in-ear device. Key features of the mobile cluster-based audio adjusting method and apparatus include: user/listener-based sound management and control; a scalable platform that can incorporate future technology—that is, new functionalities can be added because the method and apparatus are designed to seamlessly integrate additional components including, but not limited to, software applications such as a 'sound preference' application that sets user-based sound perception settings on a mobile device or wearable computer; and autonomous audio sensing. The mobile cluster-based audio adjusting method and apparatus may also be configured, manufactured, and sold across different industries (e.g. automobile or audio electronic industries).

In examples, the mobile cluster-based audio adjusting method and apparatus can be used in sound fingerprint and music publishing/performance applications. For example, the mobile cluster-based audio adjusting method and apparatus may be used in a performance venue, where fingerprint data can be sent directly to music publishing entities from the described clusters. In another example, the mobile cluster-based audio adjusting method and apparatus may interface with various communication offerings, such as e-mail, SMS, and visual screens (for instance, communicative updates can be sent with sensed audio measurements, and as a specific example, an SMS that reads a "too loud in section A'/cluster A). Moreover, the mobile cluster-based audio adjusting method and apparatus can support a fixed or unfixed number of "sensing units."

The at least one output device comprises a power source for operating the output device, a speaker for outputting sound and/or a display for outputting visual data, and a communication mechanism for receiving electronic information from the data source. The data source is in electronic communication the at least one cluster and the at least one output device. The data source comprises a memory and a processor. The memory contains computer-executable instructions for connecting to the at least one cluster and varying an output of the at least one output device (e.g. speaker or display unit). The processor executes the computer-executable instructions.

The computer-executable instructions include: identifying one or more sounds within the noise, isolating the one or more sounds, and determining if one or more of the one or more sounds includes a frequency outside of a predetermined threshold. The predetermined threshold equates to a frequency determined to pose a risk of harm to a user's hearing capabilities. If one or more of the one or more sounds includes the frequency outside of the predetermined threshold, the computer-executable instructions further include: manually or automatically altering the one or more of the one or more sounds so that the frequency does not fall outside of the predetermined threshold and outputting the one or more sounds on the at least one output device.

The system further includes an interfacing mechanism. The interfacing mechanism includes a network adapter configured to transmit and receive electronic information through both wired and wireless communication and at least one input mechanism. The at least one input mechanism is configured to manipulate the interfacing mechanism and vary the output of the at least one output device. The computer-executable instructions further include panning the sensed noise and/or equalizing the sensed noise.

A second embodiment of the present invention describes a method of altering sensed noise prior to outputting the sensed noise. The method includes providing at least one data source and providing at least one cluster of at least one computing device. The at least one computing device includes a sound sensing mechanism configured to sense a noise, a wireless transceiver or data bus configured to transmit and receive data from the data source, and at least one output device.

The at least one output device includes a power source for operating the output device, a speaker for outputting sound and/or a display for outputting visual data, and a communication mechanism for receiving electronic information from the data source. The data source is in electronic communication the at least one cluster and the at least one output device. The data source comprises a memory and a processor. The memory contains computer-executable instructions for connecting to the at least one cluster and varying an output of the at least one output device. The processor executes the computer-executable instructions.

The method further includes: identifying one or more sounds within the noise, isolating the one or more sounds, and determining if one or more of the one or more sounds includes a frequency outside of a predetermined threshold. The predetermined threshold equates to a frequency determined to pose a risk of harm to a user's hearing capabilities. If one or more of the one or more sounds includes the frequency outside of the predetermined threshold, the method further includes manually or automatically altering the one or more of the one or more sounds so that the frequency does not fall outside of the predetermined threshold and outputting the one or more sounds on the at least one output device. In some examples, the method further includes: panning the sensed noise, adding one or more audio effects to the sensed noise, and/or equalizing the sensed noise.

In examples, the at least one computing device further includes an interfacing mechanism. The interfacing mechanism includes a network adapter and at least one input mechanism. The network adapter is configured to transmit and receive electronic information through both wired and wireless communication. The at least one input mechanism is configured to manipulate the interfacing mechanism and vary the output of the at least one output device.

A third embodiment of the present invention describes a pair of smart glasses. The pair of smart glasses include: a first lens, a second lens, and a frame. Each of the first lens and the second lens include a replaceable prescription lens, a replaceable protective lens, a replaceable mixed-reality capable lens, a permanent prescription lens, a permanent protective lens, or a permanent mixed-reality capable lens, among other examples. In some examples, the frame comprises a material having reflective wave characteristics to shield a head of a user from unsafe frequencies.

The frame includes a first lens frame component configured to receive the first lens, a second lens frame component configured to receive the second lens, and a bridge disposed between and configured to affix the first lens frame component to the second lens frame component. In some examples, the pair of smart glasses also includes a charging port located at the bridge. The frame also includes a first temple affixed at a first location to the first lens frame component and a second temple affixed at a second location to the second lens frame component. The pair of smart glasses includes a first audio module located on an interior of the first temple and a second audio module located on an interior of the second temple.

The pair of smart glasses also includes a charging port located on the rear side of the bridge. Moreover, the pair of smart glasses also includes a module configured to detect one or more environmental conditions. The module may include: a light sensing module located on the front side of the bridge, an augmented reality display interface port located on the front side of the first lens frame component, a first audio module located on the rear side of the first temple, and/or a second audio module located on the rear side of the second temple. Each condition of the one or more environmental conditions may include: artificial blue light, sounds above a predetermined threshold, millimeter waves, and/or ultrasonic waves, where the predetermined threshold is a frequency determined to pose a risk of harm to a user's hearing capabilities.

In some examples, the light sensing module is a light sensing transducer. In other examples, the light sensing module is configured to: scan an environment to detect environmental hazards and transmit a notification to a first in-ear device and a second in-ear device regarding the detected environmental hazards.

Moreover, the pair of smart glasses further includes a first wire and a second wire, where each of the first wire and the second wire have a first side disposed opposite a second side. The first side of the first wire is affixed to the first location. The second side of the first wire is affixed to the first in-ear device. The first side of the second wire is affixed to the second location. The second side of the second wire is affixed to the second in-ear device. In some examples, each of the first in-ear device and the second in-ear device are removable. In other examples, the first in-ear device is retractable via the first wire and the second in-ear device is retractable via the second wire.

In further examples, each of the first audio module and the second audio module are configured to: sense a noise, identify one or more sounds within the noise, isolate the one or more sounds, and determine if one or more of the one or more sounds includes a frequency outside of a predetermined threshold. The predetermined threshold equates to a frequency determined to pose a risk of harm to a user's hearing capabilities. If one or more of the one or more sounds includes the frequency outside of the predetermined threshold, each of the first audio module and the second audio module are configured to automatically or manually alter the one or more of the one or more sounds so that the frequency does not fall outside of the predetermined threshold and output the one or more sounds to each of the first in-ear device and the second in-ear device, respectively.

In other examples, each of the first audio module and the second audio module are configured to: sense a noise, identify one or more sounds within the noise, isolate the one or more sounds, and determine if one or more of the one or more sounds includes a frequency outside of a predetermined threshold. The predetermined threshold equates to a frequency determined to pose a risk of harm to a user's hearing capabilities. If one or more of the one or more sounds includes the frequency outside of the predetermined threshold, a notification may be transmitted to the user that one or more of the one or more sounds includes the frequency outside of the predetermined threshold. In examples, each of the first lens and the second lens are mixed-reality capable lenses. In some examples, the notification is an audio notification transmitted to the user via the first in-ear device and the second in-ear device, respectively. In other examples, the notification is a visual notification transmitted to the user via the mixed-reality capable lenses of the first lens and/or the second lens. In further examples, the notification is a visual notification transmitted to the user via a smart device display.

In general, the present invention succeeds in conferring the following benefits and objectives.

It is an object of the present invention to provide audio manipulation and sound management systems.

It is an object of the present invention to provide audio manipulation and sound management systems for home audio systems.

It is an object of the present invention to provide audio manipulation and sound management systems for public address systems.

It is an object of the present invention to provide audio manipulation and sound management systems for sound reinforcement systems.

It is an object of the present invention to provide audio manipulation and sound management systems for vehicle audio systems.

It is an object of the present invention to provide audio manipulation and sound management systems for ultrasonic transducers, infrasonic transducers, electro-optical transducers, and/or microwave transducers.

It is an object of the present invention to provide audio manipulation and sound management systems for wearable devices (such as smart glasses).

It is an object of the present invention to share harmful, tech-driven issues within micro and macro-areas with users and third-party entities.

DESCRIPTION OF THE PREFERRED EMBODIMENTS

Figure 1:
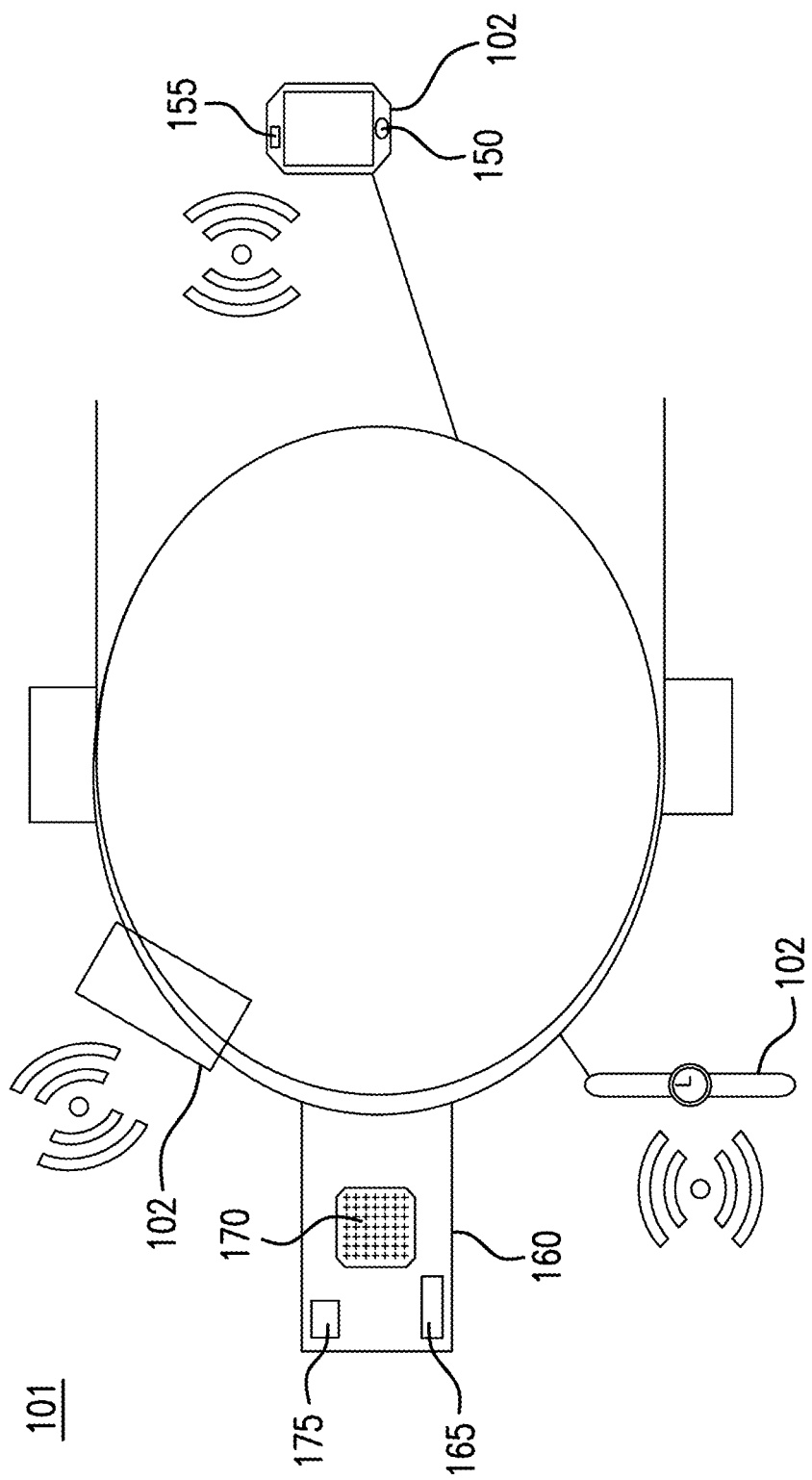
FIG. 1 depicts a schematic view of a one cluster with some interfaced devices, according to at least some embodiments described herein.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As a threshold matter, it should be noted that whenever the phrases "microphone" or "microphone-equipped" are used, it is intended to mean any device that is capable of detecting sound, not merely microphones. For example, a high-performance low frequency antenna connected to a software-defined radio may be used to input sound observations into the system, or a piezo-electric diagraph may be used to measure the vibrations the correspond to a given sound. These examples are provided to give greater clarity as to what the term "microphone" should be interpreted as, and not construed as a limiting example.

The system of the present invention operates by integrating clusters of various computing devices and wearable computers with sound management techniques and methods so that various sound "fingerprints," and various other types of data described herein, can be developed and used to visualize how sensed data is being perceived in micro or macro-areas. In various embodiments, the system of the present invention can be integrated into an individual's home, vehicle audio system, concert venues, and other locations where sound is played. In addition, the system's components allow for the present invention to be scaled to accommodate sound management and monitoring control within the largest of venues such as stadiums and other sports arenas.

Due to the devices that are integrated into the system having the ability to sense the frequency and magnitude of audio signals, a sound fingerprint (summary) can be generated from deterministic methods. These fingerprints are then communicated to a data source and can subsequently be processed and used to communicate with external applications and things such as third-party sound databases. However, the purpose of this system is not to be confused. In addition to the sound fingerprinting ability of the present invention, it is also capable of utilizing a series of methods to sense and control audio output in various venues.

In an alternative embodiment, the present invention is located in a train or airport station that has an intercom system that functions poorly when noisy crowds are present. If a data source within these facilities is able to autonomously collect audio data via a series of integrated devices, then with the present invention, the same data source can adjust system outputs accordingly in order to make important intercom announcements intelligible. In yet another embodiment, a user can enter in EQ parameters in their integrated computing device to ensure that both the audio perceived by them, and the audio perceived by their device is in accordance with some predetermined parameters/settings. While many short-range wireless technologies can be used with the present invention, preferably one or more of the following technologies will be used: ANT+, Bluetooth, Bluetooth Low Energy, versions 4.1, 4.2, and 5.0, cellular, IEEE 802.15.4, IEEE 802.22, 802.11ax (i.e. Wi-Fi 6), 802.11a/b/g/n/ac/ax, 802.15.4-2006, ISA 100a, Infrared, ISM (band); NFC, RFID, WPAN, UWS, WI-FI, Wireless HART, Wireless HD/USB, ZigBee, or Z-wave.

In yet another preferred embodiment, various in-ear systems may be integrated into the present invention, software-defined and/or cognitive-defined based in-ear transceivers can be used to wirelessly communicate with a data source and thus, the output of such an in-ear monitor can be autonomously adjusted after sensing audio output. A given output can be adjusted according to what is sensed within specified location or what is sensed at external clusters. Similarly to a software-defined and/or cognitive-defined based in-ear transceivers, an in-ear monitor system for use with the present invention will preferably comprise hardware such as, earphones, at least one body pack receiver, at least one mixer and at least one transmitter. These functions can also be adjusted and controlled via the data source of the present invention.

According to an embodiment, the functions of the present invention include sensing and isolating frequency bands associated with musical instruments/human voices in the following order: midrange, highs, and lows. According to an embodiment, the functions further include separating like frequencies (panning). According to an embodiment, the functions additionally include balancing the volume, controlling the dynamic range of the frequencies sensed (compression), performing subtractive and additive equalization, and/or adding audio effects to provide additional depth and texture.

Loud noises can often lead to stress and hearing loss. Certain frequencies and volumes can cause stress in pets, and loud music and other forms of loud sounds have put approximately 1.1 billion young people at risk of suffering from hearing loss. Furthermore, military veterans are 30% more likely to suffer from severe hearing loss than non-veterans. In fact, according to the DoD's Hearing Center for Excellence (HCE), hearing loss is the most-widespread injury among returning veterans, driving hearing loss payments to exceed $2 billion in 2016. The present invention provides for an interdisciplinary and technologically advanced approach to hearing loss prevention.

It is important to note that noise pollution not only produces negative health outcomes for humans, but also, can produce negative outcomes for pets. Loud noises and obtrusive, artificial light negatively affect pets such as cats and dogs, and can eventually lead to abnormal behaviors, like excessive whining, trembling, barking and panting. These behaviors are a result of the pets trying to cope with the stress tied to phenomena within their environment, and if left unchecked, can cause panic disorders such as, e.g., separation anxiety, which is not healthy for both pet owners and pets. It is therefore an object of the present invention to provide a method wherein at least one sound and/or light sensing device can be affixed or integrated into a pet wearable (e.g. dog collar).

Hearing loss can be considered an inevitable cost of military exercises and war. However, real-time alerts using mobile devices creates an opportunity to implement preventative measures, ultimately reducing hazardous exposure time and thus injury. Study considerations include, data sets, hearing loss incidents among veterans (on the rise), current preventative measures, gear, and equipment such as jet engines and other inherently noisy machinery.

In summary, various embodiments of the present invention are in response to the DoD commitment to reduce the number of military personnel that suffer from hearing loss injury by 1) analyzing hazardous sounds in real-time 2) alerting service members using wearable mobile devices (new preventative technique).

According to an embodiment, the present invention provides for a mobile cluster-based apparatus that analyzes, reports, and controls outputs based on a range of inputs over a swath of frequency bands, with distinct applications including sound output control, hazardous millimeter-wave, blue light or RF detection and reporting, and ultrasonic and infrasonic wave detection and reporting. Since artificial blue light from devices can accelerate blindness, in a blue light sensing application, a wearable in close proximity to a user's retina (e.g. located on a collar of a smart jacket) can measure prolonged blue light retina exposure and report the issue back to the user. According to an embodiment, the apparatus is configurable and uses standard computing devices, such as wearables, tablets, and mobile phones, to measure various frequency bands across multiple points, allowing a single user to visualize and adjust sound output, and in some cases, detect and report hazardous signals.

Each year, sound companies spend billions of dollars on audio technologies and audio research to find new ways to improve audio quality in performance settings. Proposed is an apparatus and method that creatively tackles the issue of poor audio quality and sound perception across various spaces by integrating consumer-based mobile devices, wearable computers and sound management systems. The ubiquitous computing devices in this method and apparatus senses soundwaves, associates sensed audio levels with specific clusters (locations), predicts whether or not an audio-related issue is likely to occur within a specific cluster (for instance, predicts if an echo is likely to occur), and adjusts audio intensity (and related EQs) accordingly to improve audio output quality.

Key features of the Mobile Cluster-Based Audio Adjusting Method and Apparatus include:

- User/listener-based sound management and control
- Scalable platform that can incorporate future tech—that is, new functionalities can be added because the method and apparatus is designed to seamlessly integrate additional components including, but not limited to, software applications such as a 'sound preference' application that sets user-based sound perception settings on a mobile device or wearable computer.
- Integrates with existing audio hardware and software— such as in-ear systems, mixer boards and other related audio consoles
- Autonomous audio sensing
- Can be configured, manufactured and sold across different industries (e.g. automobile or audio electronic industries)
- Can be used in sound fingerprint and music publishing/ performance applications (e.g. in a performance venue, fingerprint data can be sent directly to music publishing entities from the described clusters
- Can interface with various communication offerings such as e-mail, SMS, and visual screens (for instance, communicative updates can be sent with sensed audio measurements. A specific example—an SMS that reads a "too loud in section A'/cluster A)
- Can support a fixed or unfixed number of "sensing units"

Referring to FIG. 1, an embodiment of one cluster 101 of the present invention with some interfaced devices. Specifically, three embodiments of at least one computing device 102 are shown; wearable glasses, wearable watch, and a smartphone. It should be noted that while these three devices are listed as exemplary examples, any device with a sound sensing mechanism 150 and a way to transmit any recorded data is suitable for use as one of said at least one computing devices 102. According to an embodiment, the sound sensing apparatus may be an omnidirectional transducer, an ultrasonic transducer, an infrasonic transducer, a microwave transducer, and/or any other suitable sound sensing apparatus, while maintaining spirit of the present invention. The sound sensing mechanisms of at least one computing device 102 will be able convert perceived sounds into electronic signals so that the recorded information may be transmitted to neighboring clusters 101, or a data source (See FIG. 3), as desired. This data will be transmitted using either one or a combination of short-range wireless technologies, namely, ANT+, Bluetooth, cellular, IEEE 802.15.4, IEEE 802.22, ISA 100a, Infrared, ISM (band), NFC, RFID, WPAN, UWS, WI-FI, Wireless HART, Wireless HD/USB, ZigBee, or Z-wave. Preferably, transducers integrated into these computing devices have an output signal that is fed into the input of an analog-to-digital converter ("ADC") and can incorporate software and cognitive-defined radios to broaden the selection of compatible wireless communication interfaces and limit radio component footprints. According to an embodiment, the at least one computing device 102 includes one or more wireless transceivers 155.

Figure 2:
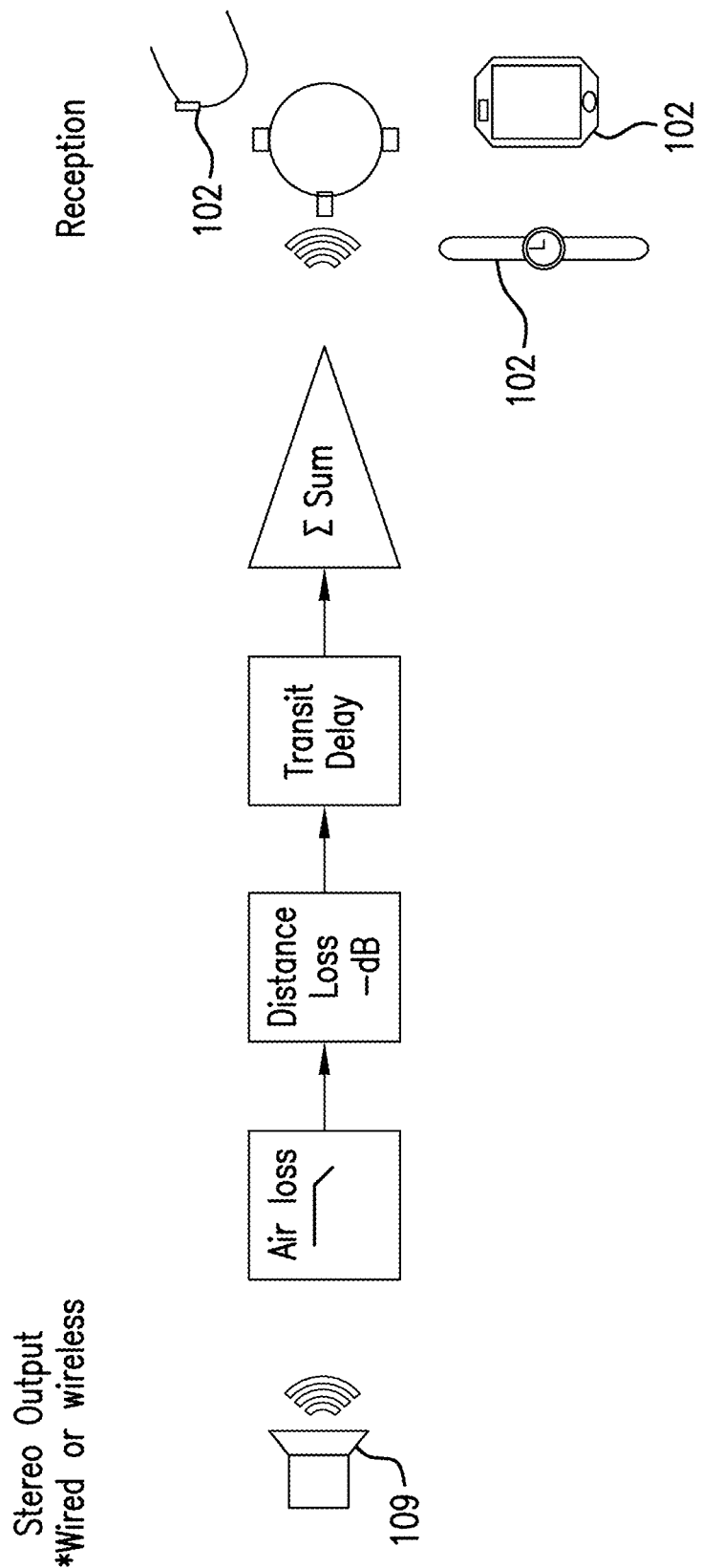
FIG. 2 depicts a schematic view of how interfaced devices create a sound fingerprint, according to at least some embodiments described herein.

FIG. 2 shows a schematic view of how interfaced devices create a sound fingerprint. The sound transmission of the audio energy 109 sensed by the at least one computing device 102 propagates through air and is received by at least one computing device 102 using the transmission path outlined in FIG. 2.

Assuming that FIG. 2 depicts audio transmission in an indoor setting, at specified time intervals, each computing device measures the sound pressure level (SPL) and sound power level (SWL):

$$SPL = SWL + 10\log\left[\frac{Q_\theta}{4\pi r^2} + \frac{4}{R_C}\right]$$

Where:
SPL=Sound pressure level dB
SWL=Sound power level=10 $\log_{10}(W/W_{ref})$
W is the total sound power radiated from a source with respect to a reference power ($W_{ref}$) dBW re $10^{-12}$ Watts.
r=distance from source m
$Q_\theta$=directivity factor of the source in the direction of r
S=total surface area of a room $m^2$
$\alpha_{av}$=average absorption coefficient in a room $$R_C = \text{room constant} = \frac{S\alpha_{av}}{1-\alpha_{av}}m^2$$

Over time, each computing device in FIG. 2 detects differences in pressure (i.e. change in pressure vs. time) and converts the differences into an electrical signal. A Fast Fourier Transform is implemented (locally or in a cloud) to measure the relative amplitudes of the frequencies 'sensed' and to perform other frequency domain analyses.

It is important to note that in any given indoor environment, $R_c$, $\alpha_{av}$, and S can be predetermined and made available to each computing device, approximated or deemed negligible. Also note that each computing device in FIG. 2 has a microphone. Computing devices may also obtain sound observations via a high-performance low frequency antenna.

Figure 3:
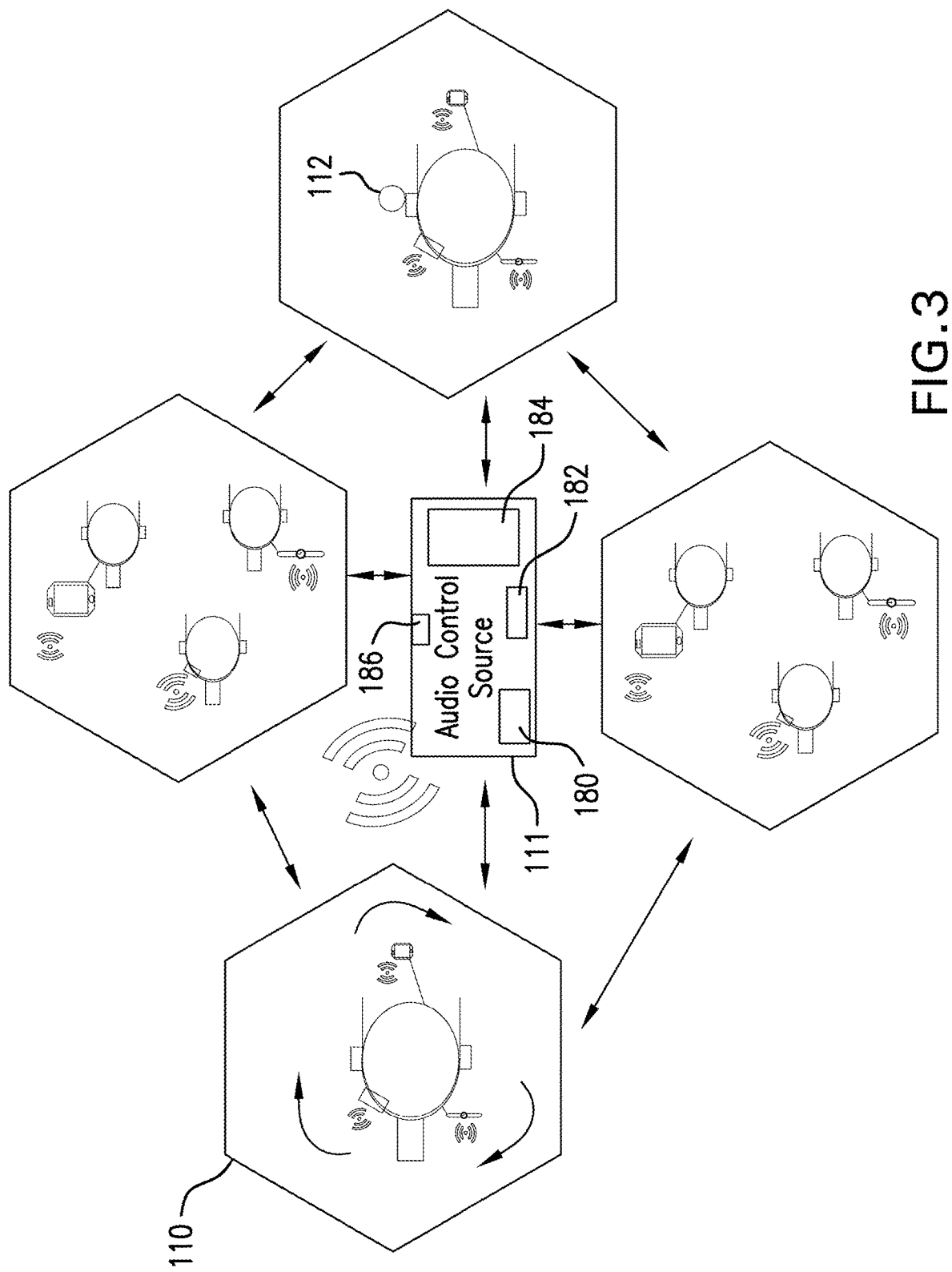
FIG. 3 depicts an illustration of a system engaging in inter-cluster, cluster-to-data source, and cluster-to-cluster data sharing, according to at least some embodiments described herein.

Turning to FIG. 3 an illustration of an embodiment of the system of the present invention engaging in intra-cluster, cluster-to-data source; and cluster-to-cluster data sharing. Here, each cluster has a given location 110 (i.e. specified location) to accurately isolate and associate the sensed data. In one embodiment, the present invention is able to adjust a given output device 160 based on its proximity to a given location 110 of a cluster. In alternative embodiments, output devices 160 can be adjusted based on their proximity to more than one cluster. Devices in each cluster can either communicate directly to each other or a data source 111, devices within a cluster can communicate to a single device within that cluster which can serve as a gateway to other clusters and/or data source 111. In some embodiments, the present invention further comprising an in-ear monitoring device 112. According to an embodiment, the output devices 160 may include a power source 165 (such as, e.g., a battery or other suitable power source 160), a speaker 170, a communication mechanism 175 (such as, e.g., a wired and/or wireless transceiver), and/or any other suitable mechanisms (as shown in FIG. 1). According to an embodiment, the data source 111 includes a memory 180, a processor 182, an interface mechanism 184, and/or at least one input mechanism 186. According to an embodiment, the interface mechanism 184 is a graphical user interface with a display (e.g., a touch screen display). According to an embodiment, the at least one output device 160 is located within said at least one cluster 101, such that said data source 111 may alter the power supplied to said speaker 170 in real-time.

The embodiment depicted here shows devices that sense audio signal energy within the confines of a single cluster and then sends data directly to an audio control unit and other clusters. Therefore, not only can these computing devices wirelessly share sensed data with each other, but, also, data can be shared with an data source 111 (for audio output management purposes) and other devices in other clusters. Depending on the audio signal energy sensed within a specific cluster(s), data source 111 adjusts any connected output devices in either a single cluster, or multiple clusters to ensure high quality/fidelity output.

Figure 4:
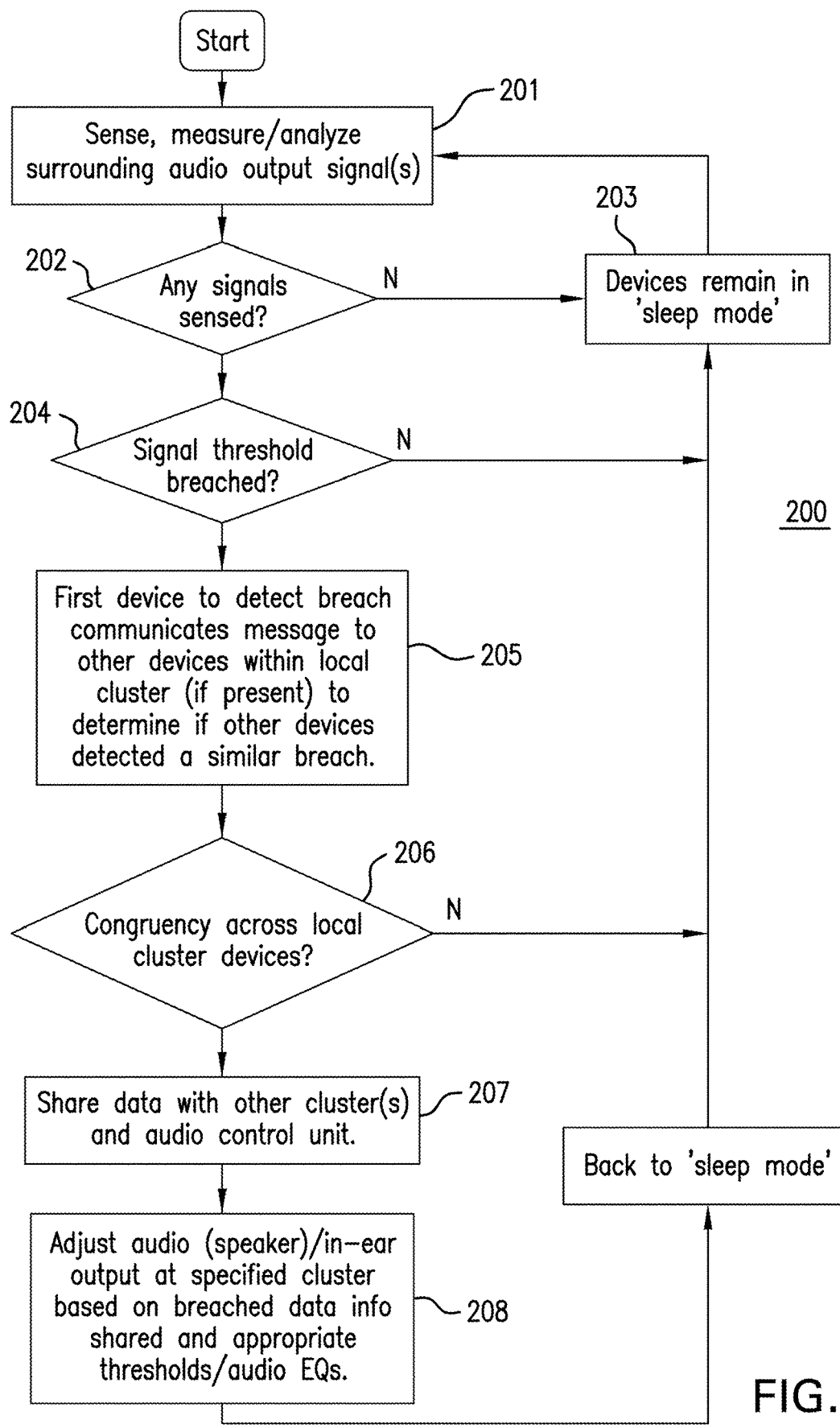
FIG. 4 depicts a block diagram of a flowchart of a method, according to at least some embodiments described herein.

FIG. 4 shows a flow chart outlining an embodiment of the method of the present invention. Here, method 200 is comprised of a number of steps. In step 201, initially, both desired and undesired audio output signals are sensed and subsequently analyzed. In step 202, the method proceeds to determine whether or not the input signals match a set of predefined thresholds. If there is only negligible output audio, that is, if the audio within an environment is outside of a specified frequency range, the method proceeds to step 203 where the devices in each cluster operate in sleep mode. If there is indeed sensible audio output, the method proceeds to step 204 where the present invention determines if the predefined threshold or EQ setting is breached. If this threshold is breached, the method moves to step 205 where the first device that sensed the breach will (preferably, wirelessly) communicate its signal measurements to other devices within its cluster and the receiving device will conduct the same audio measurements to confirm the threshold breach. Preferably, step 205 is repeated amongst all of the devices within a single cluster, to provide more robust data sets. Once the breach confirmation stage is completed, in step 206, the present invention moved to step 207 where at least one computing device is chosen to communicate the breach to. Finally, in step 208, when the present invention, via the audio control source, adjusts audio levels at the at least one output device to transform undesired audio outputs to desired audio outputs.

Figure 5:
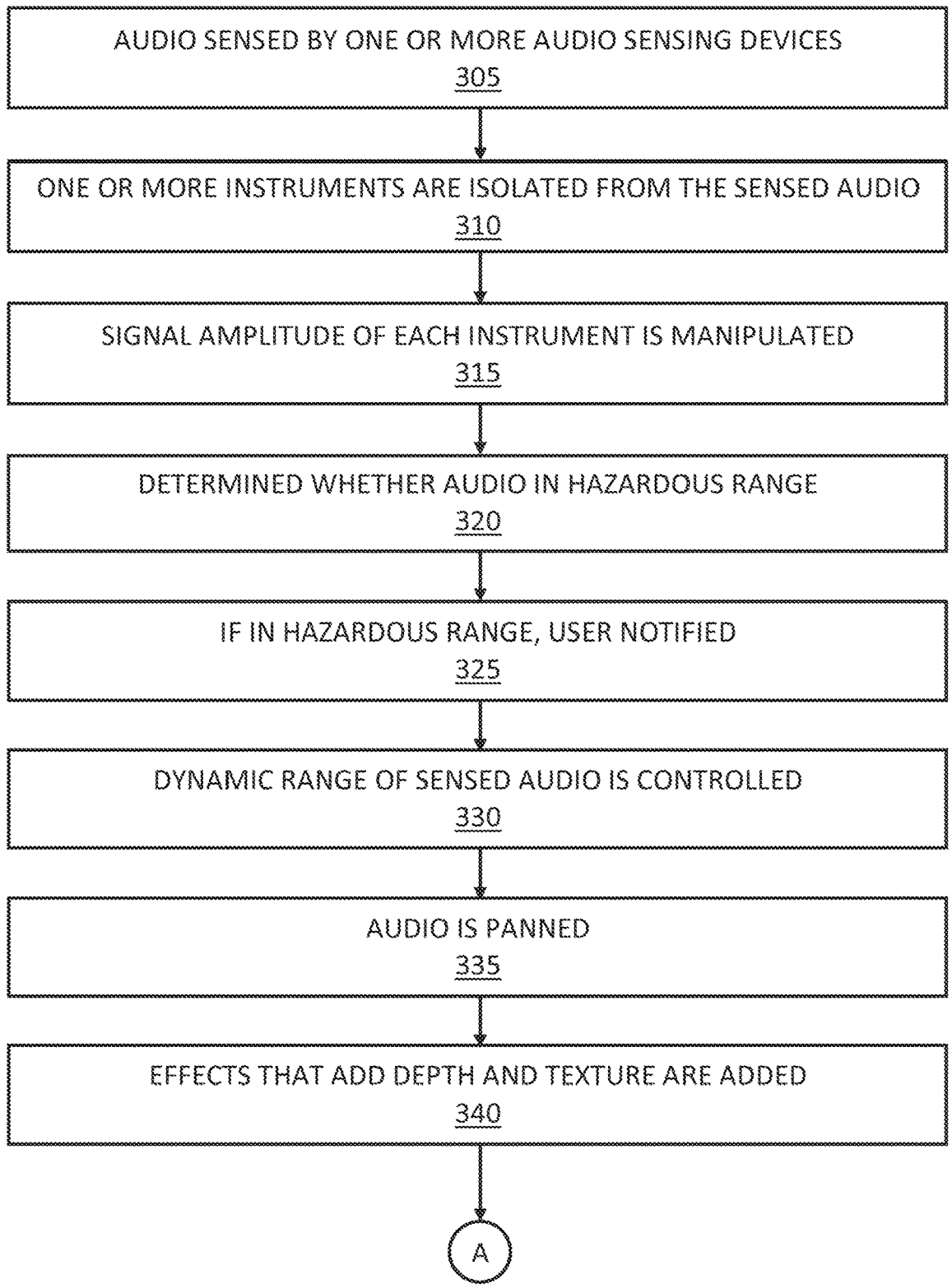
FIG. 5 depicts a block diagram of a flowchart of a method, according to at least some embodiments described herein.
Figure 6:
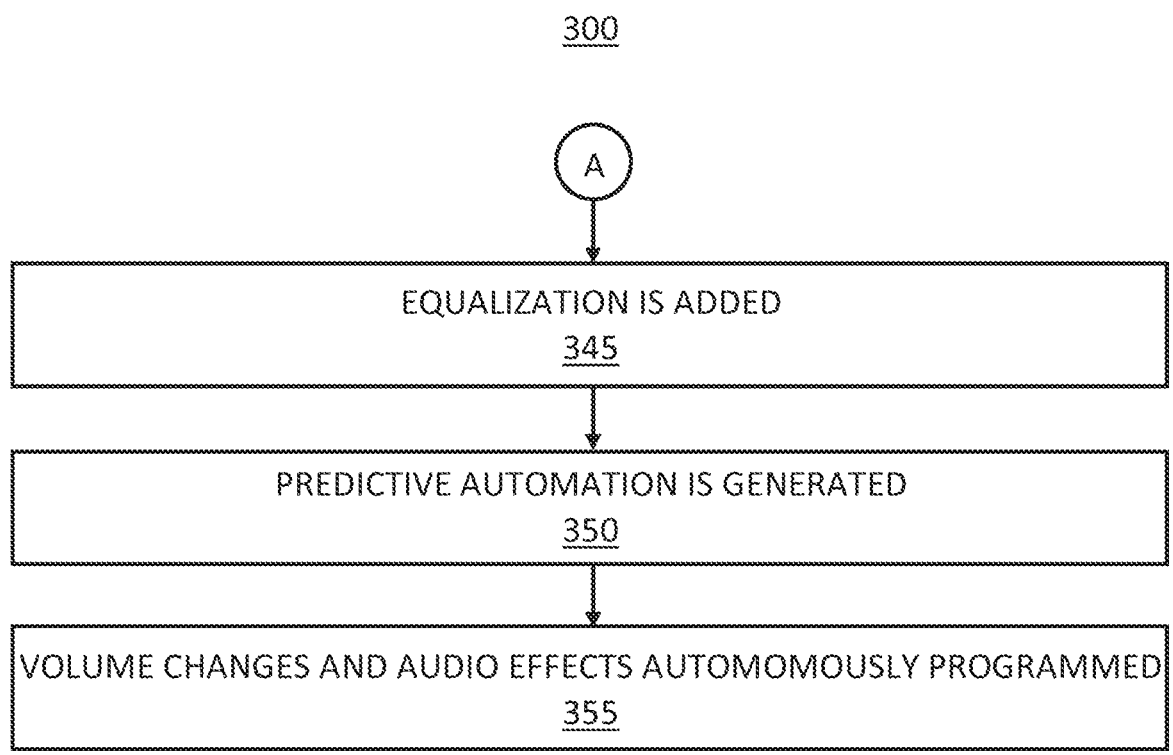
FIG. 6 depicts a block diagram of a flowchart of a method, according to at least some embodiments described herein.

Referring now to FIGS. 5-6, a flowchart 300 of an embodiment of the present invention is illustratively depicted, in accordance with an embodiment of the present invention.

According to an embodiment, the present invention isolates and/or separates sounds within band, reports findings of those sounds to a cloud-based system for audio signal processing (if necessary), and sends control commands to one or more commercial mixing consoles and/or audio control sources to alter the audio output (if necessary), and then communicate with apparatus devices to share and confirm sensed audio findings (if necessary). According to an embodiment, these sounds are associated with different frequencies and/or are associated with one or more instruments.

At step 305, audio/noise is sensed by one or more audio sensing devices. According to an embodiment, the one or more sensing devices are microphones.

At steps 310-315, the volume between the sensed audio is balanced. That is, one or more instruments and/or frequencies are identified and isolated from the sensed audio (at step 310), and the signal amplitude of each instrument is manipulated using a mixing console/audio source (at step 315). It is noted, however, that, at step 310, the identified sounds need not always be instruments. The sounds may be any suitable identifiable sounds, while maintaining the spirit of the present invention.

According to an embodiment, the present system may sense different types of phenomena (e.g., it may sense audio using an audio transducer such as a microphone, it may include a smartwatch and/or other similar device that may be able to sense ultrasonic waves using an ultrasonic transducer, and/or the system may incorporate one or more various suitable types of transducers). According to an embodiment, the system may be configured to sense environmental phenomena outside of the acoustic frequency range by using a variety of transducers. In those cases, the underlying functionality of the system generally remains the same, regardless of the input phenomena sensed. The system may measure the intensity of an acoustic wave, ultrasonic wave, infrasonic wave, and/or any other suitable waves.

According to an embodiment, the system may incorporate various input/output functions/details, such as those shown in Table 1. According to an embodiment, the system is configured to sense, analyze, and/or control audio outputs.

TABLE 1

| SYSTEM INPUT | SYSTEM FUNCTION | OUTPUT |
| --- | --- | --- |
| Network Interface: Sense audible sounds via mic or comparable audio sensing transducer | Apparatus will isolate/separate sounds within band, report findings to cloud-based system for audio signal processing (if necessary), send control commands to commercial mixing console and/or data sourceto alter audio output (if necessary) and communicate with apparatus devices to share and confirm sensed audio findings (if necessary) | Network Interface Configured to: Control mixing console(s) and/or an audio control source(s) via physical or SDR-based transceiver(s)** |
| 20-40 Hz | Sub Bass *(Piano, Synthesizer Strings) | kHz: 125/134 |
| 40-160 Hz | Bass Band (Drums, Strings, Winds, Vocals, Piano, Synthesizer) | MHz: 13.56/600/ 800/850/900/1700/1800/1900 |
| 160-300 Hz | Upper Bass Band (Drums, Strings, Winds, Vocals, Piano, Synthesizer) | 2100/2200/L700/U700/2300/ 2400/2500/2700/3500/5200/ |
| 300-800 Hz | Low-Mid Band (Drums, Strings, Winds, Vocals, Piano, Synthesizer) | 5700/whitespaces between 54 and 860/ |
| 800-2.5 kHz | Mid-Range Band (Drums, Strings, Winds, Vocals, Piano, Synthesizer) | GHz: 3.6/4.9/5/5.9 /24 to 300 300 GHz to 430 THz |
| 2.5-5 kHz | Upper Mid Band (Drums, Strings, Winds, Vocals, Piano, Synthesizer) | |

TABLE 1-continued

| SYSTEM INPUT | SYSTEM FUNCTION | OUTPUT |
|---|---|---|
| 5-10 kHz | High Frequency Band (Drums - including Cymbals, Synthesizer) Ultra-High Freq Bands (Hi-Hat, Cymbals, Hiss) | |

It is also noted that the present invention may further have implications in sensing and analyzing millimeter waves, which the human ear cannot hear. Higher-frequency millimeter-waves can possibly have adverse effects on human health. According to an embodiment, the present system can (as shown in Table 2), in real-time, detect and report harmful, high-energy level millimeter waves, which are included in many 5G deployment plans.

TABLE 2

| SYSTEM INPUT | SYSTEM FUNCTION | OUTPUT |
|---|---|---|
| Network Interface: Sense millimeter-waves via a mm Wave transducer | Apparatus will detect, analyze, measure and/or report harmful millimeter-waves across several environments | Network Interface Configured to: Report/share data via physical or SDR-based transceiver(s)** |
| 24 to 300 GHz | Identify and measure millimeter-wave characteristics | kHz: 125/134 MHz: 13.56/600/800/850/900/ 1700/1800/1900 2100/2200/L700/U700/2300/ 2400/2500/2700/3500/5200/5700/ whitespaces between 54 and 860/ GHz: 3.6/4.9/5/5.9 /24 to 300 300 GHz to 430 THz |

Weaponized infrasonic and ultrasonic devices with highly directional energy transmissions can produce both psychological and physical effects on humans. In addition, blue light (short wavelength) emitted from displays is harmful to the retina. For this reason, a light sensing transducer is a part of the apparatus described herein. According to an embodiment, the present system can, in real-time, detect and report harmful infrasonic and ultrasonic devices in weaponized scenarios. According to an embodiment, the apparatus described can (as shown in Table 3), in real-time, detect and report harmful infrasonic and ultrasonic devices in weaponized scenarios.

TABLE 3

| SYSTEM INPUT | SYSTEM FUNCTION | OUTPUT |
|---|---|---|
| Network Interface: Sense infrasonic, ultrasonic waves, and/or light waves via an ultrasonic, infrasonic or electro-optical transducer | Apparatus will detect, analyze, measure and/or report on harmful ultrasonic or infrasonic waves across several environments | Network Interface Configured to: Report/share data via physical or SDR-based transceiver(s) |
| 18.9 Hz, 0.3 Hz, 7 Hz and 9 Hz 700 kHz to 3.6 MHz 20 to 200 kHz 400-770 THz | Identify and measure ultrasonic, infrasonic or visible wave characteristics | kHz: 125/134 MHz: 13.56/600/ 800/850/900/1700/1800/1900 2100/2200/L700/U700/ 2300/2400/2500/2700/3500/ 5200/5700/whitespaces between 54 and 860/ GHz: 3.6/4.9/5/5.9 /24 to 300 300 GHz to 430 THz |

At step 320, it is determined whether the sensed audio includes any audio in frequencies that have been predetermined to be hazardous to human ears. According to an embodiment, if audio in the hazardous range has been detected, then one or more users are notified, at step 325. The notification may take the form of a visual notification, an audible notification, and/or any other suitable form of notification. It is noted, however, that, if automatically corrected, the user need not always be notified.

According to an embodiment, at step 330, the dynamic range of the sensed audio (compressed or limiting) is controlled by sending audio data to a mixing console/data source or cloud-based system that can identify and mitigate sudden peaks in a sensed audio stream to help sound(s) sit consistently in an audio mix (accomplished by removing sudden peaks). Altering the dynamic range may also be used to eliminate any audio in the predetermined hazardous range. At step 335, the audio is panned. That is, like frequencies in the sensed audio are separated.

At step 340, effects that add depth and texture to audio outputs are added and, at step 345, equalization is added using subtractive and/or additive equalization techniques.

According to an embodiment, at step 350, automation is generated that predicts environmental conditions based on sensed data (like echoes and audio wind steers) and, at step 355, volume changes and audio effects are autonomously programmed, accordingly.

According to an embodiment, the present invention includes acoustic band applications. Consumer products, such as, e.g., wearables, smartphones, and other portable computing devices autonomously control sound output(s) in private spaces (e.g. cars and homes) and public spaces (e.g. transport stations and theater/concert venues). According to an embodiment, the present system senses audible sounds via a mic or comparable audio sensing transducer and isolates/separates sounds within certain bands, reports findings to cloud-based system(s) for audio signal processing, sends control commands to a commercial mixing console and/or data source to alter audio output, and communicates with cluster devices to share and confirm sensed audio findings. According to an embodiment, the present system outputs to control mixing console(s) and/or an audio control source(s) via physical or SDR-based transceiver(s).

According to an embodiment, the present system senses and analyzes audio frequencies across clusters to adjust and control audio output and perceived sound at a given locale. In order to achieve high-quality sound and sound equalization of a sonic presentation, a sound system's audio output levels are autonomously adjusted via a central audio mixing source using intelligent tell-tale frequency characteristics gathered from clusters comprised of smart devices and/or wearable computers.

According to an embodiment, the audio signal data obtained within clusters enables a system integrated mixing console to manage audio output based on detailed frequency descriptions of acoustic properties and characteristics across a venue, room, or vehicle. According to an embodiment, the present system incorporates a modular structure so that components can be added and expand as consumer needs grow.

According to an embodiment, the present system provides for an apparatus that is configured to adjust and control audio output signal levels across multiple cluster locales using computing devices such as smartphones and/or wearable computers; a wireless transmission platform; transceivers—software-defined, cognitive-defined and/or hardware-defined; wireless microphones; in-ear monitors—software-defined, cognitive-defined and/or hardware-defined; and a central audio mixing source.

According to an embodiment, the apparatus of the present invention may include, but is not limited to, the following functions:
  Balancing the volume between sensed audio. For example, isolating instruments based on frequency and manipulating the signal amplitude of each instrument using a mixing console/audio source.
  Controlling the dynamic range of the sensed audio (compress or limiting) by sending audio data to a mixing console/audio source or cloud-based system that can identify and mitigate sudden peaks in a sensed audio stream to help sounds sit consistently in an audio mix (accomplished by removing sudden peaks).
  Panning.
  Adding effects that add depth and texture to audio outputs.
  Equalization using subtractive/additive equalization techniques.
  Automation that 1) predicts environmental conditions based on sensed data (like echoes and audio wind steers) and 2) autonomously programs volume changes and audio effects accordingly.

Figure 7A:
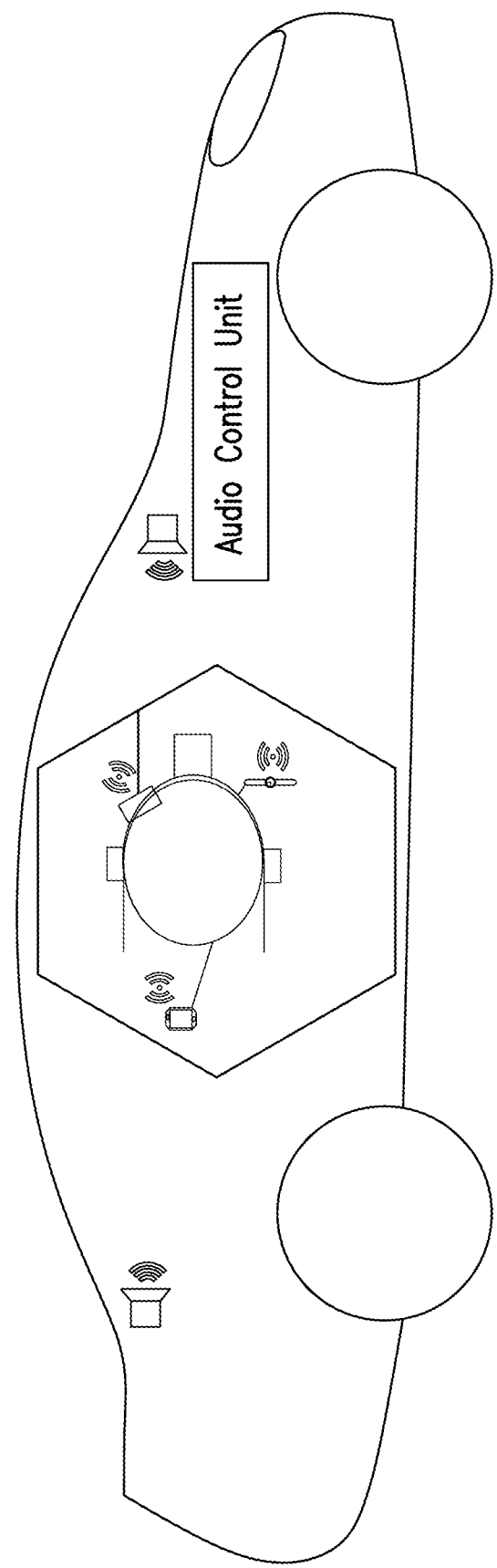
FIG. 7A depicts an illustrated embodiment of the present invention located in an automobile, according to at least some embodiments described herein.
Figure 7B:
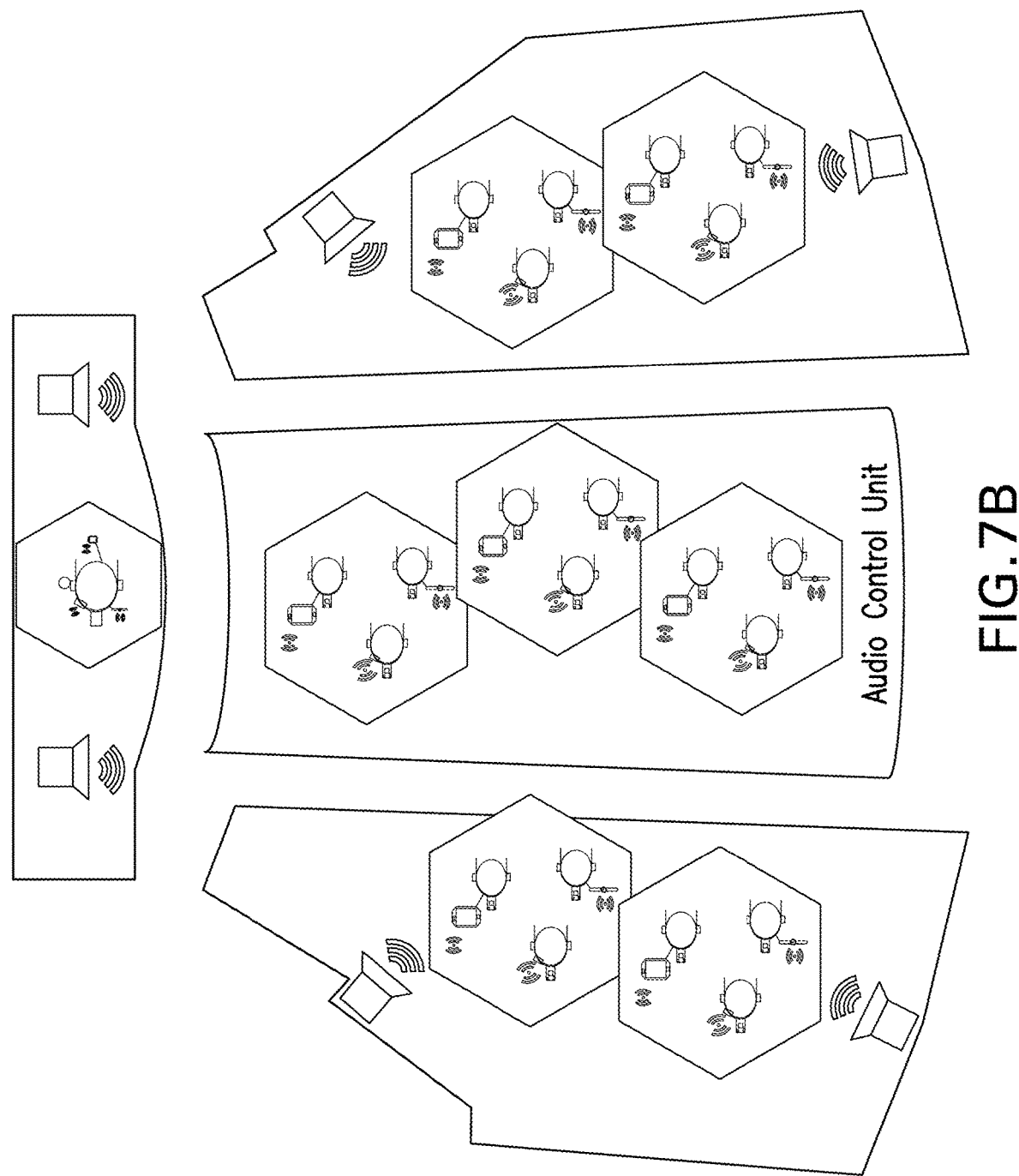
FIG. 7B depicts an illustrated embodiment of the present invention located in an indoor theatre, according to at least some embodiments described herein.
Figure 7C:
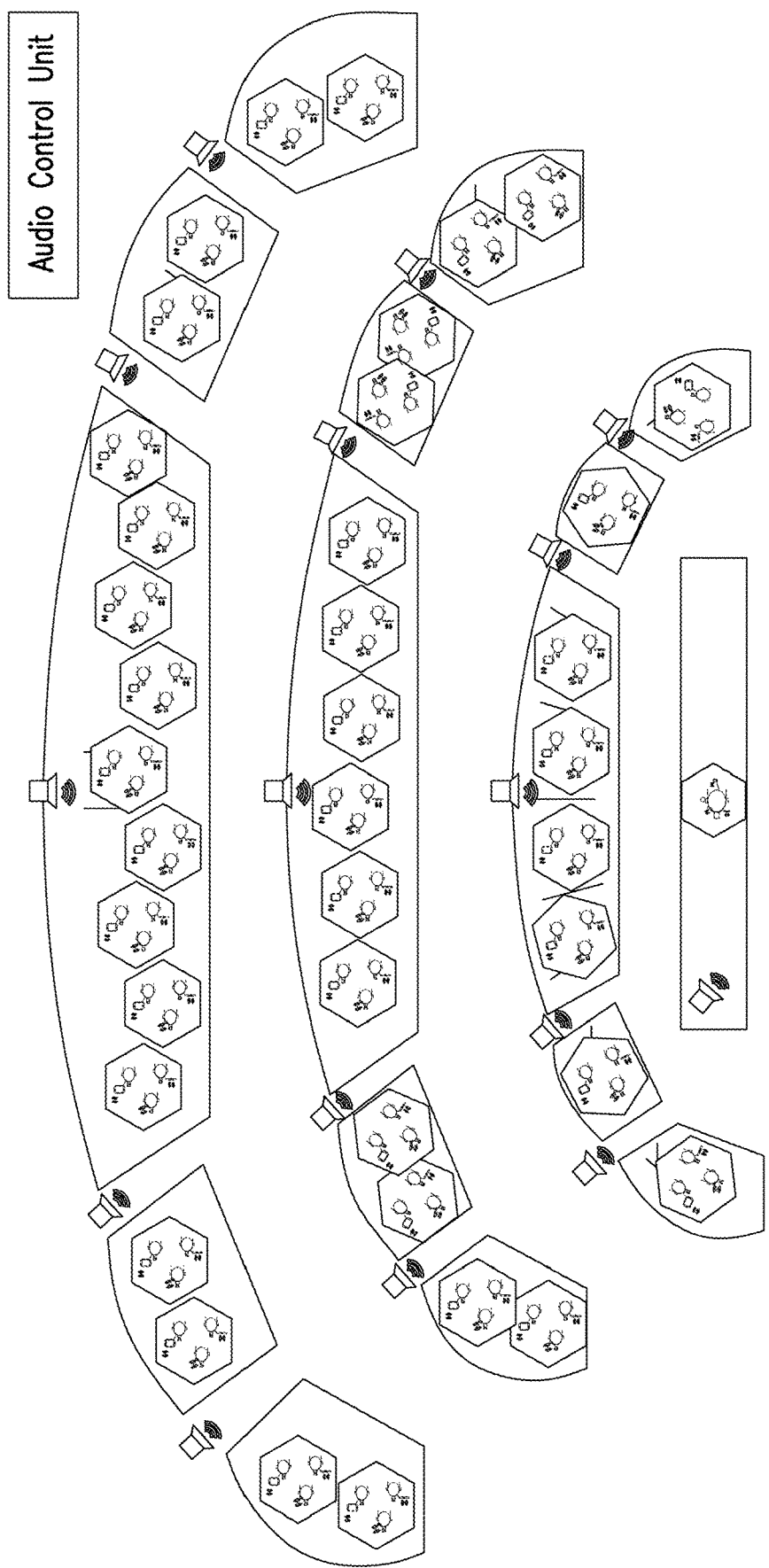
FIG. 7C depicts an illustrated embodiment of the present invention located in an outdoor stadium, according to at least some embodiments described herein.

Referring to FIGS. 7A-7C, various embodiments of the present invention implemented in an automobile, an indoor theatre, and an outdoor stadium, respectively, are shown. While these venues are particularly suited for the present invention to be implemented in any venue in which there are multiple listeners.

In a preferred embodiment, the sound sensing mechanisms (preferably, transducers) used within each "sensing" computer/device outputs an output signal that is fed into the input of an ADC. In the configurations described in FIGS. 7A, 7B and 7C, a single-ended ADC interface can be used effectively since ADCs and the transducer source are both located on the same integrated circuit board. However, since fully differential interfaces have performance gains over single-ended inputs due to its inherent noise rejection characteristics, using a fully-directional interface instead of a single-ended interface may be desirable.

Figure 8:
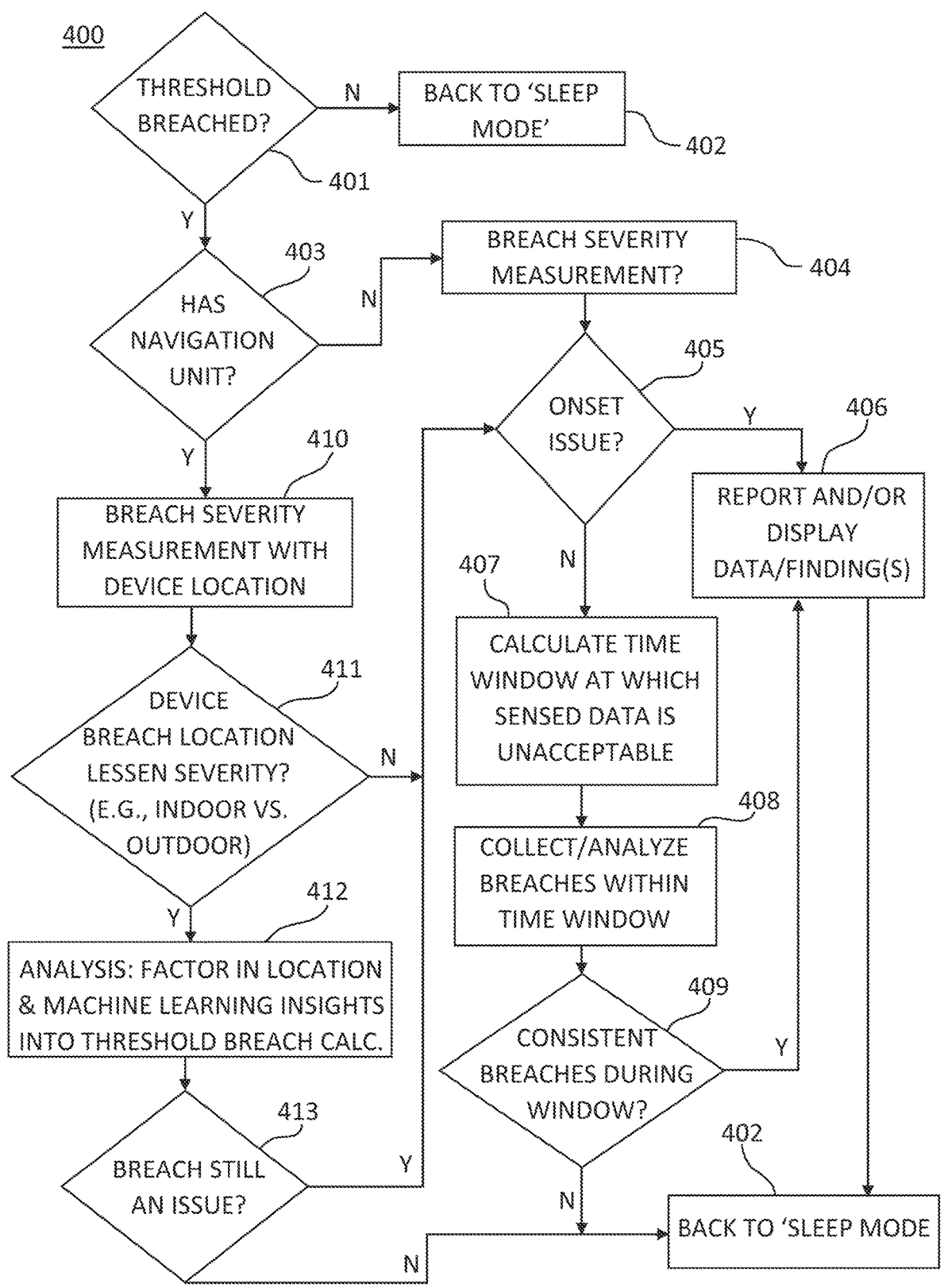
FIG. 8 depicts a block diagram of a flowchart of a method, according to at least some embodiments described herein.
Figure 9:
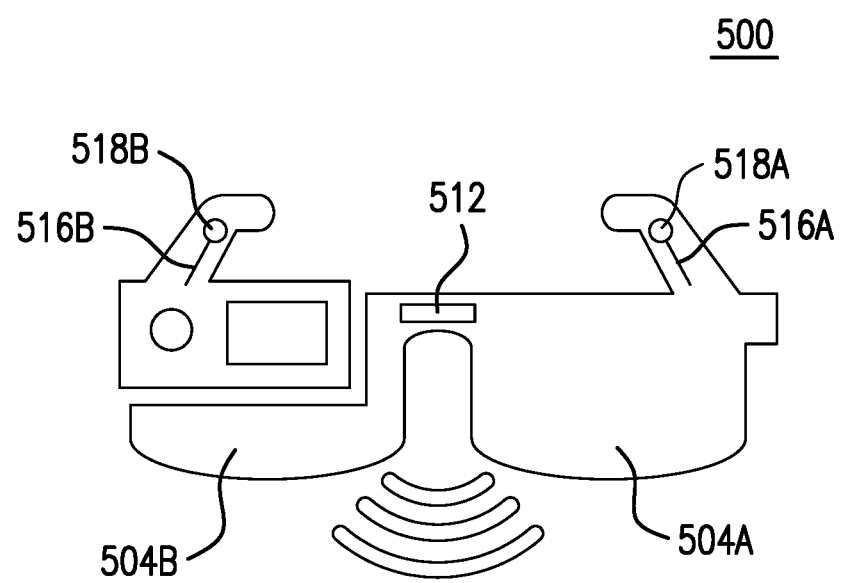
FIG. 9 depicts a schematic diagram of a front view of smart glasses with lenses, according to at least some embodiments described herein.
Figure 10:
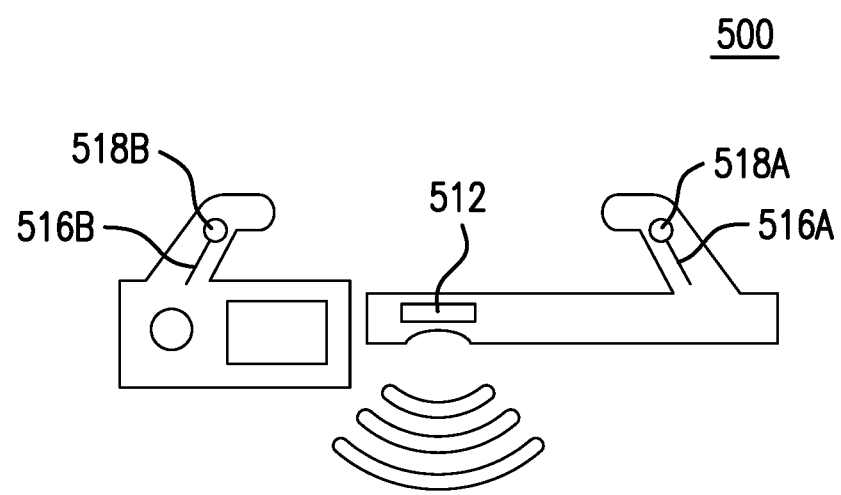
FIG. 10 depicts a schematic diagram of a front view of smart glasses without lenses, according to at least some embodiments described herein.
Figure 11:
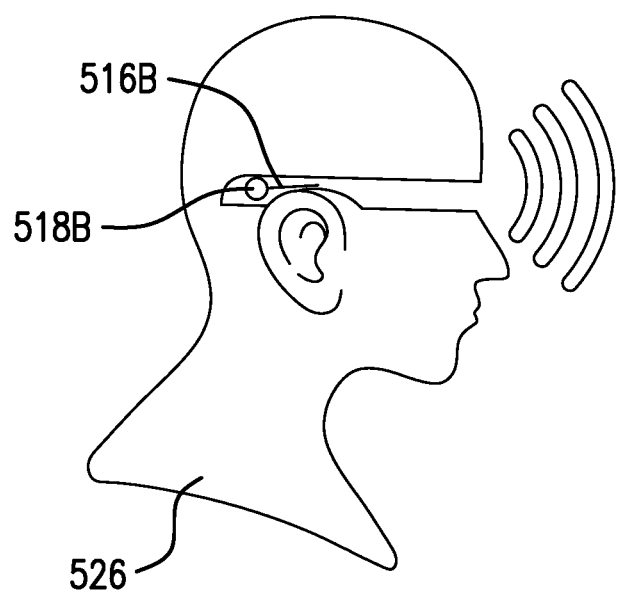
FIG. 11 depicts a schematic diagram of a side view of a user wearing smart glasses, according to at least some embodiments described herein.
Figure 12:
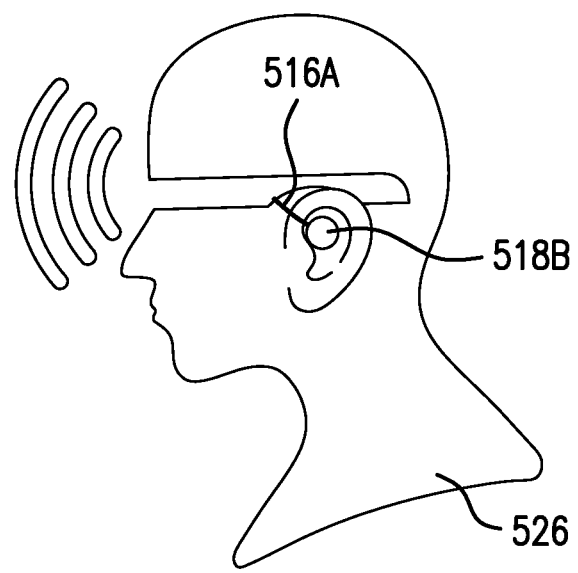
FIG. 12 depicts a schematic diagram of another side view of a user wearing smart glasses, according to at least some embodiments described herein.

FIG. 8 shows a flow chart outlining an embodiment of the method of the present invention. Here, method 400 is comprised of a number of steps. According to an embodiment, the method as shown and described in FIG. 8 showcases the method steps of a system that measures the intensity of phenomena and its purpose is to sense, analyze, report, and, in some cases, control invisible phenomena. These invisible phenomena can include, e.g., ultrasonic waves, audio waves, infrasonic waves, mm waves etc. (using ultrasonic transducers, infrasonic transducers, microwave transducers, among others, and associated software for these applications).

As in method 200 of FIG. 4, initially, both desired and undesired signals are sensed and subsequently analyzed. It is then determined whether or not the input signals match a set of predefined thresholds. If there is only negligible sensed data, that is, if the signal within an environment is outside of a specified frequency range, the devices in each cluster operate in sleep mode, step 402. If there is indeed a sensible signal, the method proceeds to step 401 where the present invention determines if the predefined threshold or EQ setting is breached. If this threshold is not breached, the device operates in sleep mode 402. If this threshold is breached, the method moves on to step 403, where it is determined whether the device has a navigation unit. According to an embodiment, devices in the system can auto-awaken out of sleep mode based on the location of the device (e.g. when a user walks into a concert venue, the system will begin measuring surrounding signal energy).

If the device does not have a navigation unit, the method moves to step 404, where a breach severity measurement is determined. Once the breach severity measurement is determined, the method moves to step 405, where it is determined whether there is an onset issue.

If there is an onset issue, the method moves to step 406, in which any data and/or findings are reported and/or displayed. Once the data and/or findings are reported and/or displayed, the device returns to sleep mode, step 402.

If there is not an onset issue, the method moves to step 407, wherein a time window is calculated at which any sensed data was determined to be unacceptable. Once this time window is calculated, the method moves to step 408, wherein breaches within the calculated time window are collected and/or analyzed. Once the breaches within the calculated time window are collected and/or analyzed, the method moves to step 409, wherein it is determined whether there were consistent breaches during the time window. If there were consistent breaches during the time window, the method moves to step 406. If there were not consistent breaches during the time window, the device goes back to sleep mode, step 402.

If the device has a navigation unit, the method moves to step 410, wherein breach severity measurements with the device's location are determined. Once the breach severity measurements with the device's location are determined, the method moves to step 411, wherein it is determined whether the device's location at the time of the breach lessened the severity of the breach. If the device's location at the time of the breach did not lessen the severity, the method moves to step 405, wherein it is determined whether there is an onset issue. If the device's location at the time of the breach did lessen the severity, the method moves to step 412, wherein an analysis takes place in which location and machine learning insights are factored into the threshold breach calculations. The method then moves to step 413, where it is determined if the breach is still an issue. If the breach is still an issue, the method moves to step 405, wherein it is determined whether there is an onset issue. If the breach is not still an issue, the device goes back to sleep mode, step 402.

According to an embodiment, environmental measurements may be skewed depending on the device's location (e.g., in a bag, in a pocket, etc.). According to an embodiment, the location of the device is detected, and, in these cases, the system will either account for signal degradation in the measurement or disable environmental measurements based on predefined thresholds. According to an embodiment, smart devices (e.g., smartphones, etc.) will use an accelerometer and/or light sensor and/or a temperature sensor to detect whether or not the smart device is directly exposed to phenomena (i.e. whether or not the device is in a bag or pocket).

The methods and systems described herein may also be used with wearable devices, such as smart glasses. As explained supra, devices may be harmful to the human body. Artificial blue light emitted from devices can accelerate blindness. Devices may additionally result in hearing loss. Furthermore, 5G devices may alter cell growth. To combat these issues, wearable devices may be configured to warn users of harmful, technology-driven environmental conditions. A pair of smart glasses 500 may be depicted, at least, in FIG. 9-FIG. 19.

As depicted, the pair of smart glasses 500 may include a first lens 504A, a second lens 504B, and a frame. The first lens 504A and the second lens 504B may be depicted, at least, in FIG. 9, FIG. 13, FIG. 14, FIG. 15, FIG. 16, FIG. 17, FIG. 18, and FIG. 19. The frame of the pair of smart glasses 500 may be depicted, at least, in FIG. 13, FIG. 18, and FIG. 19. Each of the first lens 504A and the second lens 504B may be a replaceable prescription lens, a replaceable protective lens, a replaceable mixed-reality capable lens, a permanent prescription lens, a permanent protective lens, or a permanent mixed-reality capable lens, among other examples not explicitly listed herein.

Figure 13:
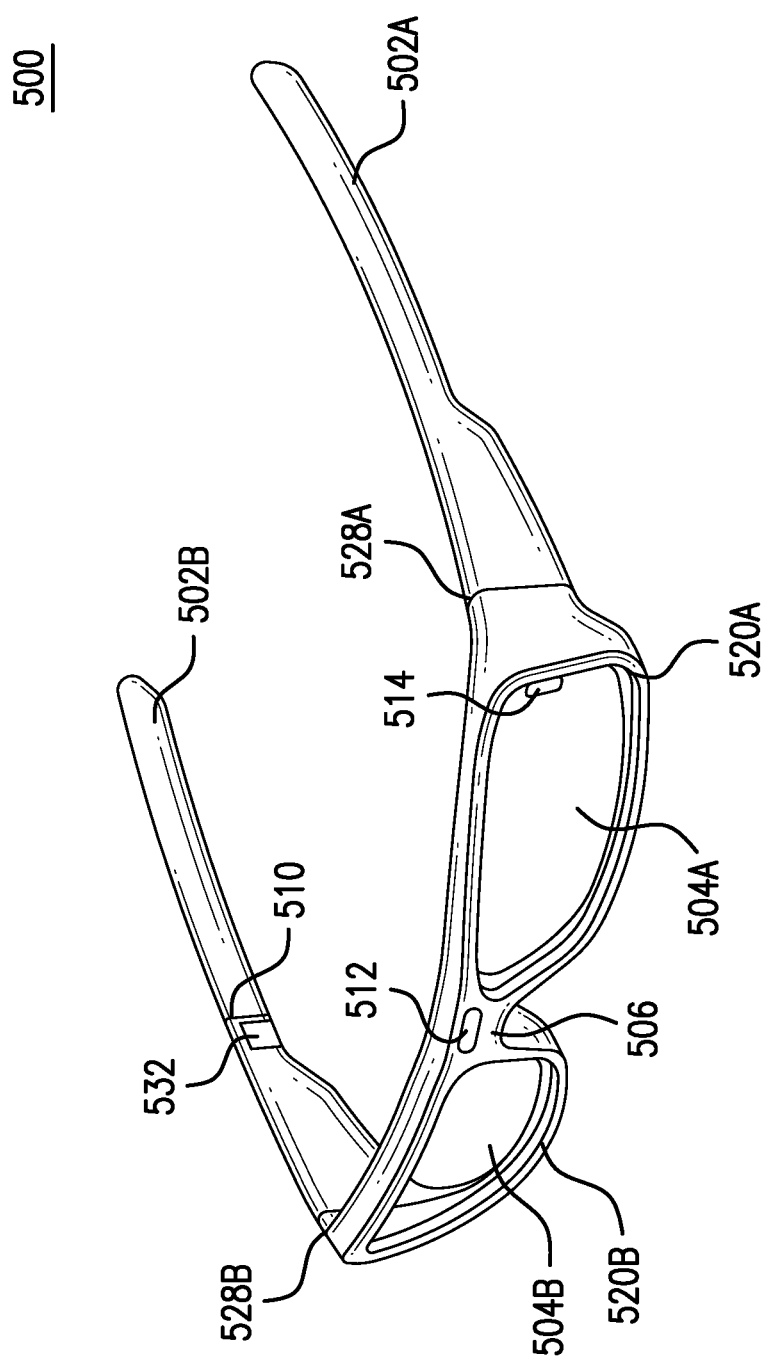
FIG. 13 depicts a front perspective view of smart glasses, according to at least some embodiments described herein.

The frame may include a first lens frame component 520A configured to receive the first lens 504A and a second lens frame component 520B configured to receive the second lens 504B (as depicted in FIG. 13). The frame may also include a bridge 506 disposed between and configured to affix the first lens frame component 520A to the second lens frame component 520B (as depicted in FIG. 13). The frame may additionally include a first nose pad 530A and a second nose pad 530B (as depicted in FIG. 18).

The frame may further include a first temple 502A (as depicted in FIG. 13, FIG. 16, FIG. 18, and FIG. 19) affixed at a first location 528A (as depicted in FIG. 13) to the first lens frame component 520A (as depicted in FIG. 13) and a second temple 502B (as depicted in FIG. 13, FIG. 17, FIG. 18, and FIG. 19) affixed at a second location 528B (as depicted in FIG. 13) to the second lens frame component 520B (as depicted in FIG. 13). Moreover, a first audio module (not shown) may be located on an interior of the first temple 502A above a first ear of the user 526 when the user 526 is wearing the pair of smart glasses 500. A second audio module 532 may be located on an interior of the second temple 502B above a second ear of the user 526 when the user 526 is wearing the pair of smart glasses 500 (as depicted in FIG. 13). In some examples, the frame comprises one or more materials having reflective wave characteristics to shield a head of a user 526 from unsafe frequencies.

Figure 14:
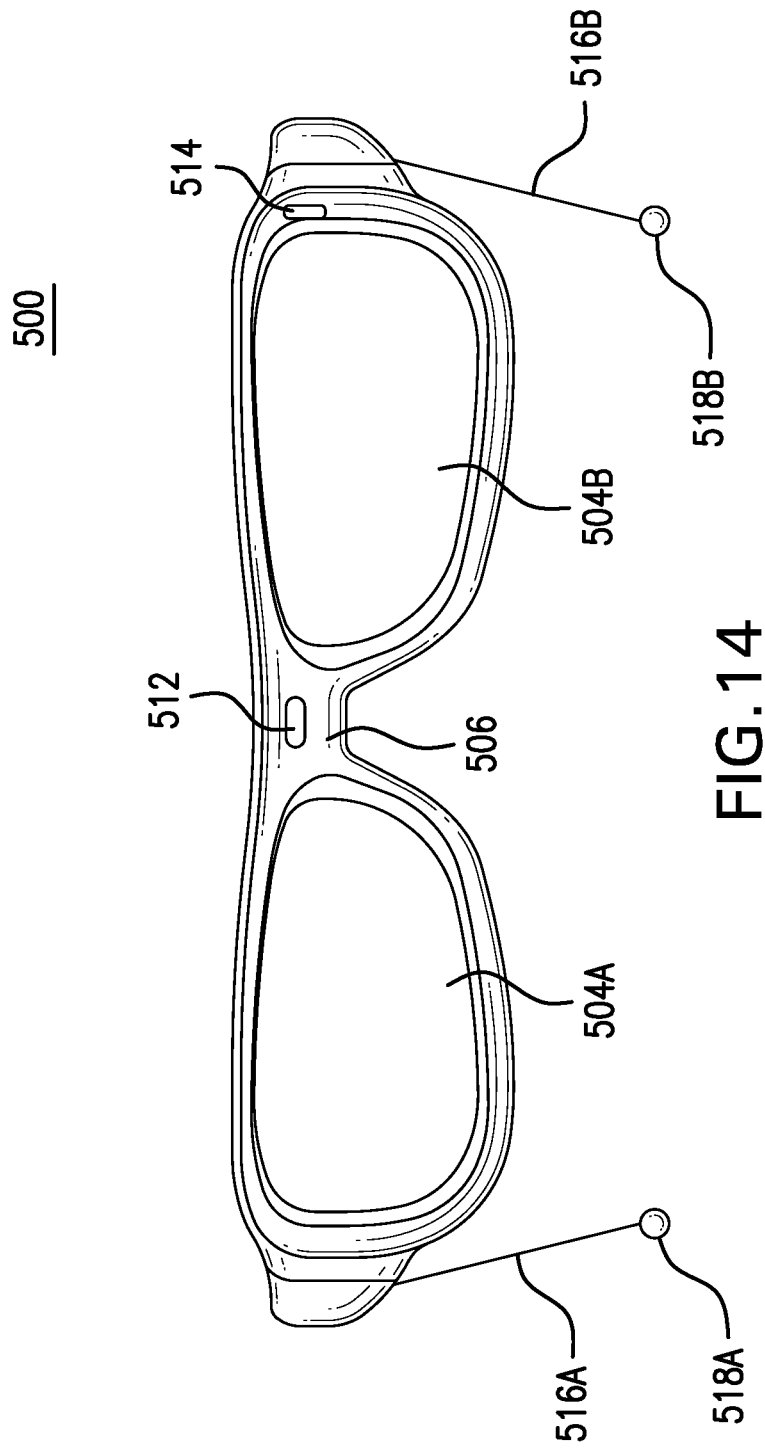
FIG. 14 depicts a front view of smart glasses, according to at least some embodiments described herein.
Figure 15:
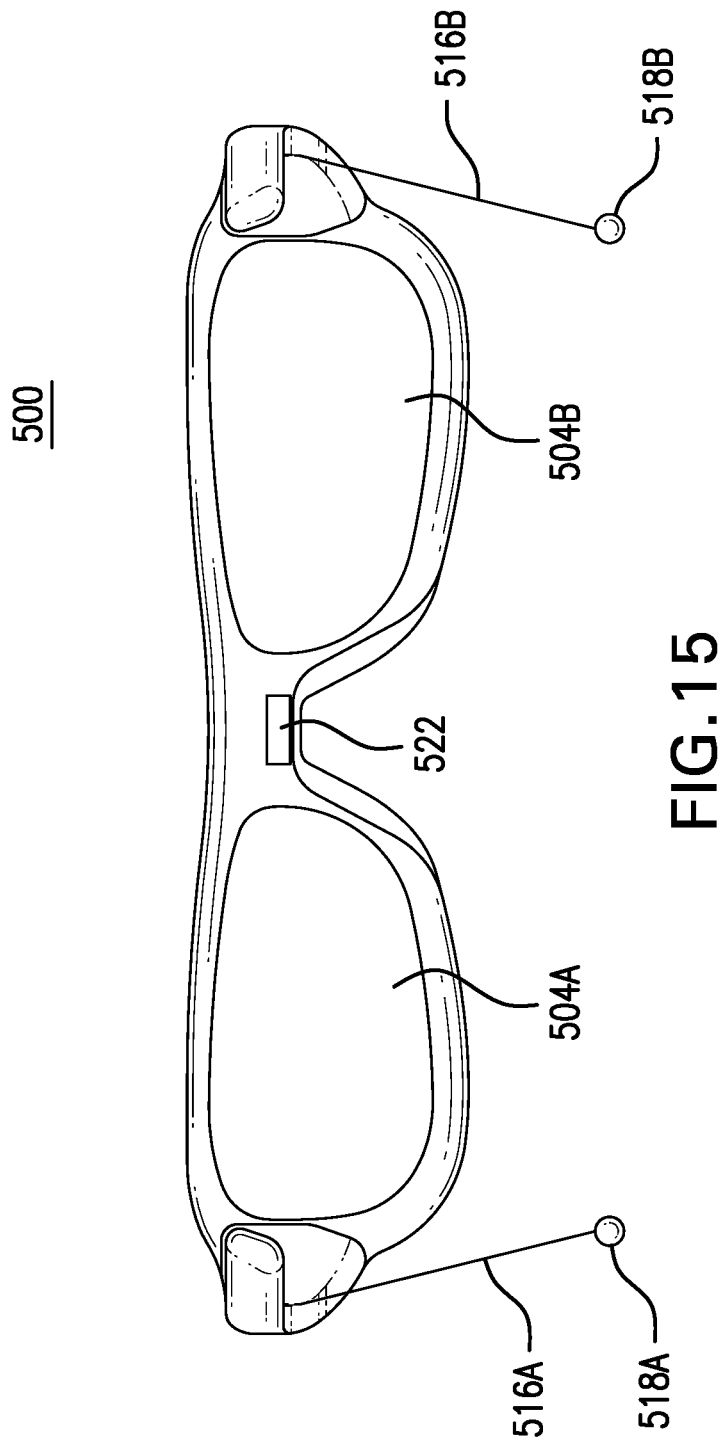
FIG. 15 depicts a rear view of smart glasses, according to at least some embodiments described herein.
Figure 16:
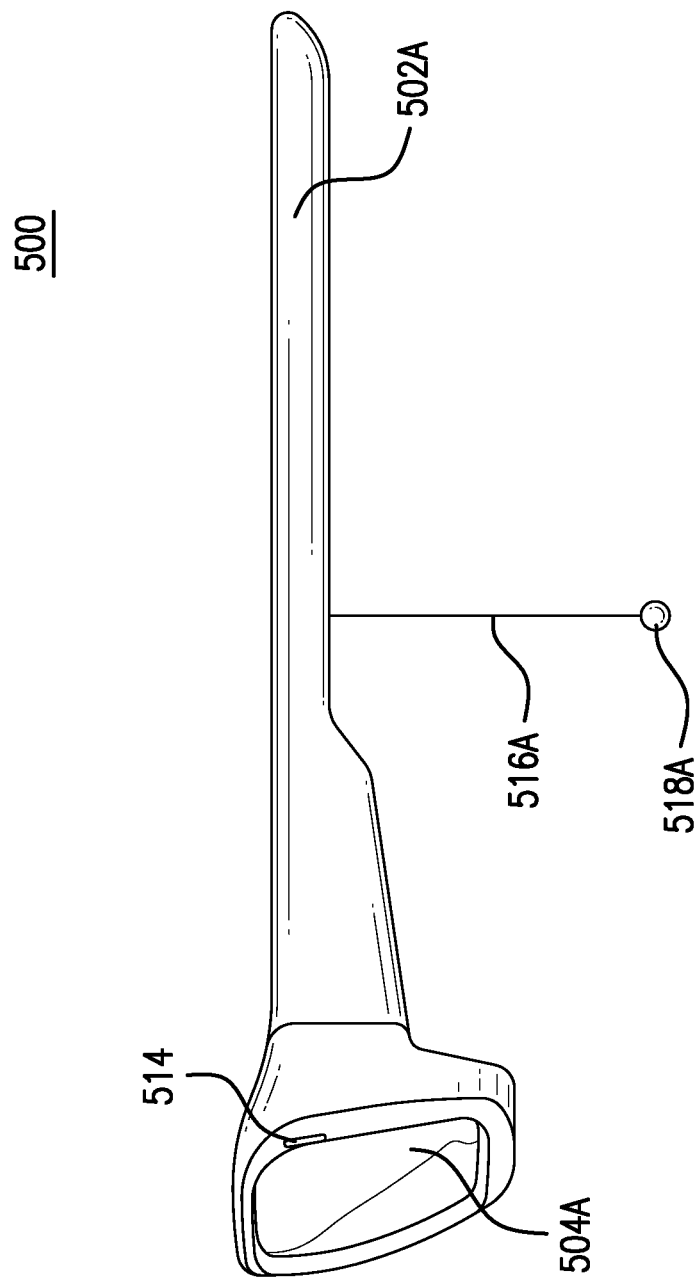
FIG. 16 depicts a left side view of smart glasses, according to at least some embodiments described herein.
Figure 17:
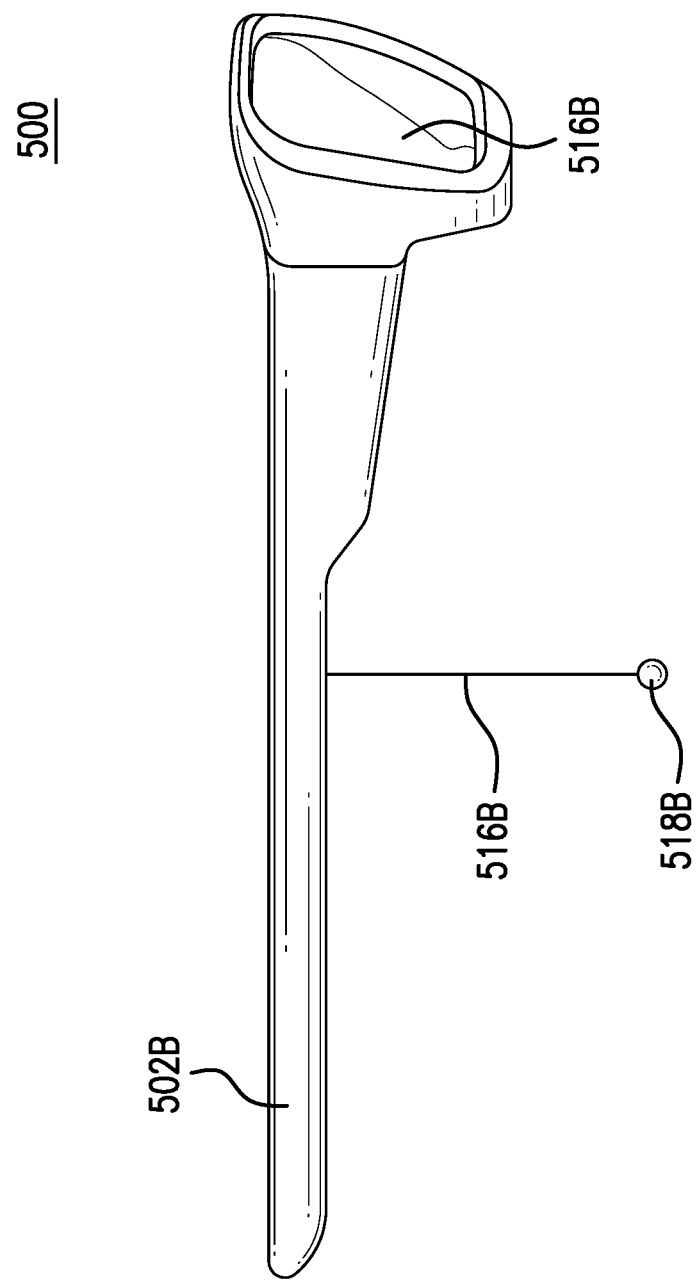
FIG. 17 depicts a right side view of smart glasses, according to at least some embodiments described herein.
Figure 18:
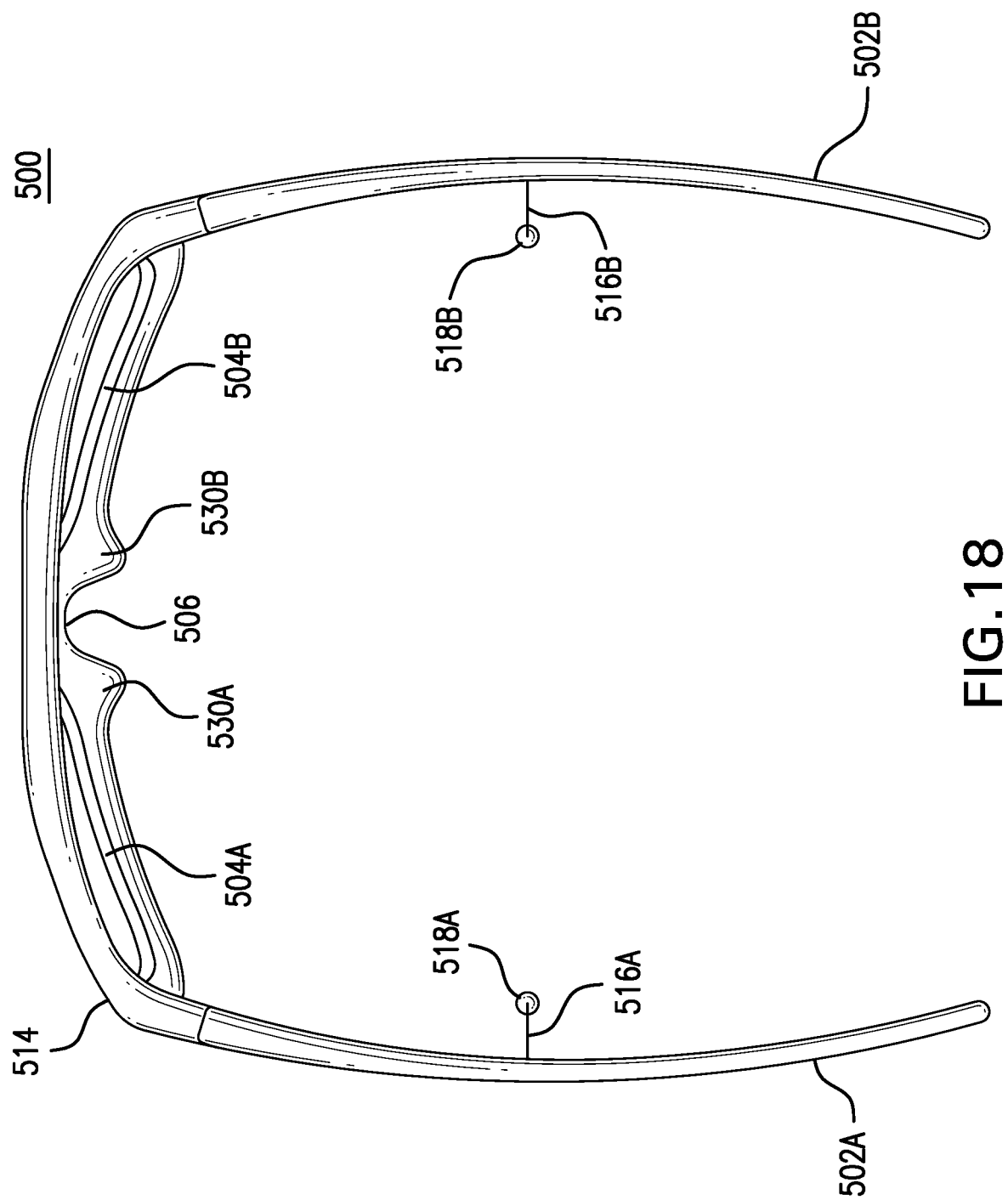
FIG. 18 depicts a top view of smart glasses, according to at least some embodiments described herein.
Figure 19:
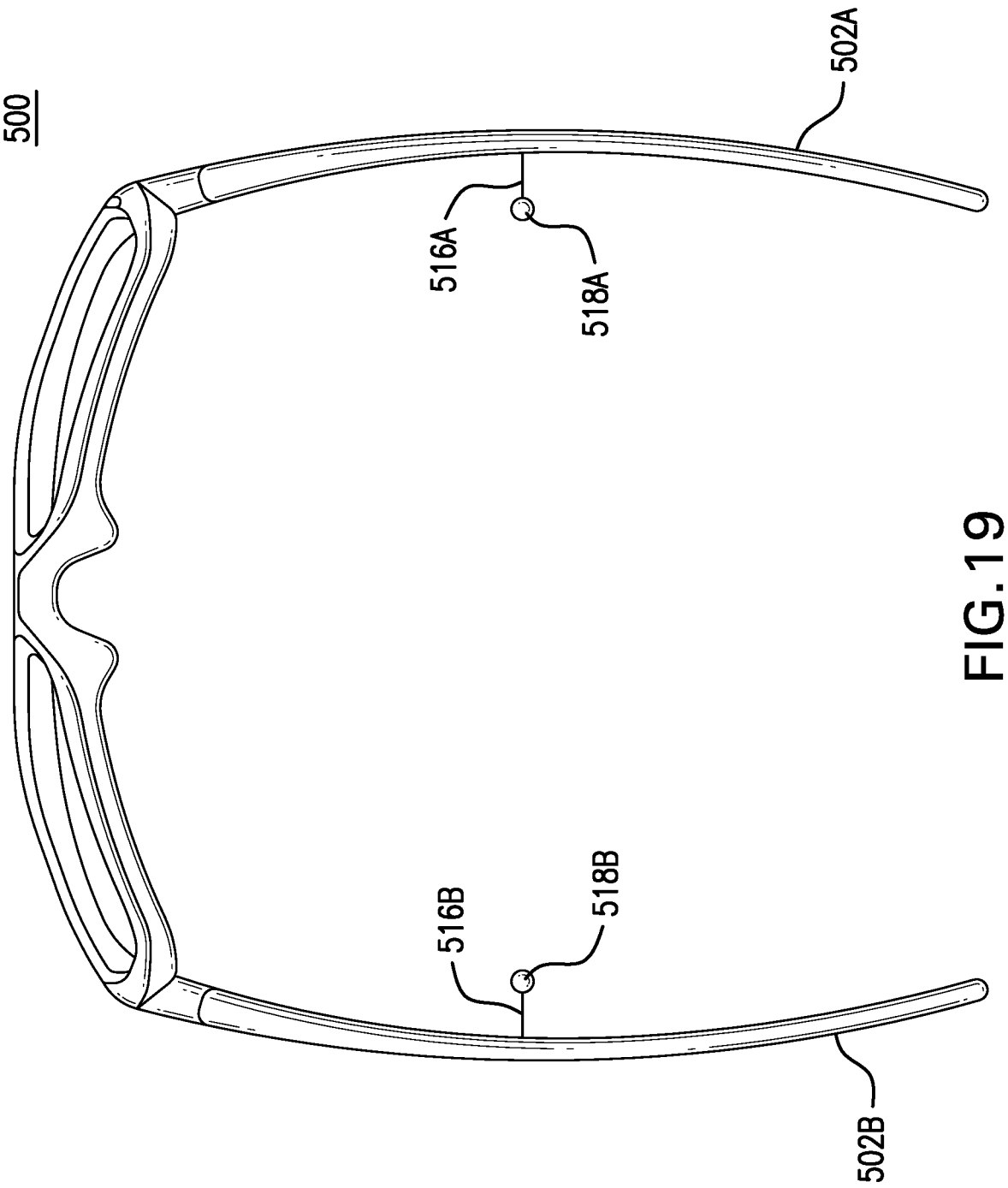
FIG. 19 depicts a bottom view of smart glasses, according to at least some embodiments described herein.

The pair of smart glasses 500 may also include a light sensing module 512 (as depicted in FIG. 9, FIG. 10, FIG. 13, and FIG. 14) and a charging port 522 (as depicted in FIG. 15), each being located at the bridge 506 (as depicted in FIG. 13, FIG. 14, and FIG. 18). The light sensing module 512 may be located on a front side of the pair of smart glasses 500 and the charging port 522 may be located on a rear side of the pair of smart glasses 500. A charging cord or device may be connected to the charging port 522 to charge the pair of smart glasses 500. The front side may be disposed opposite the rear side of the pair of smart glasses 500. The rear side of the pair of smart glasses 500 may be configured to be located closer to the face of the user 526 than the front side.

As explained, the blue light emitted from displays is harmful to the retina and can accelerate blindness in the user 526. For this reason, the light sensing module 512 may be a light sensing transducer. In other examples, the light sensing module 512 is configured to scan an environment to detect environmental hazards and transmit a notification to a first in-ear device 518A (as depicted in FIG. 9, FIG. 10, FIG. 12, FIG. 14, FIG. 15, FIG. 16, FIG. 18, and FIG. 19) and a second in-ear device 518B (as depicted in FIG. 9, FIG. 10, FIG. 11, FIG. 14, FIG. 15, FIG. 17, FIG. 18, and FIG. 19) to inform the user 526 of the detected environmental hazards.

The pair of smart glasses 500 may further include an augmented reality display interface port 514 (as depicted in FIG. 13, FIG. 14, FIG. 16, and FIG. 18) located at the first lens frame component 520A. The augmented reality display interface port 514 may be located on the front side of the pair of smart glasses 500. The augmented reality display interface port 514 may be used for add-on devices or components.

Moreover, the pair of smart glasses 500 may further include a first wire 516A (as depicted in FIG. 9, FIG. 10, FIG. 12, FIG. 14, FIG. 15, FIG. 16, FIG. 18, and FIG. 19) and a second wire 516B (as depicted in FIG. 9, FIG. 10, FIG. 11, FIG. 14, FIG. 15, FIG. 17, FIG. 18, and FIG. 19). Materials comprising the first wire 516A and the second wire 516B are non-limiting. The first wire 516A and the second wire 516B may each have a first side disposed opposite a second side. The first side of the first wire 516A may be affixed to the first location 528A. The second side of the first wire 516A may be affixed to the first in-ear device 518A. The first side of the second wire 516B may be affixed to the second location 528B. The second side of the second wire 516B may be affixed to the second in-ear device 518B.

In examples, each of the first in-ear device 518A and the second in-ear device 518B are removable. In further examples, the first in-ear device 518A is retractable via the first wire 516A and may be stored in a sleeve (not shown)

located on an interior of the first temple 502A proximate a head of the user 526 when the pair of smart glasses 500 are worn. The second in-ear device 518B is retractable via the second wire 516B and may be stored in a sleeve 510 located on an interior of the second temple 502B proximate the user's head when the pair of smart glasses 500 are worn (as depicted in FIG. 13).

In additional examples, each of the first audio module (not shown) and the second audio module 532 may be configured to sense a noise, identify one or more sounds within the noise, isolate the one or more sounds, and determine if one or more of the one or more sounds includes a frequency outside of a predetermined threshold. The predetermined threshold equates to a frequency determined to pose a risk of harm to a hearing capability of the user 526. If one or more of the one or more sounds includes the frequency outside of the predetermined threshold, each of the first audio module (not shown) and the second audio module 532 are configured to automatically alter the one or more of the one or more sounds so that the frequency does not fall outside of the predetermined threshold and output the one or more sounds to each of the first in-ear device 518A and the second in-ear device 518B, respectively, for the user 526. In other examples, if the one or more of the one or more sounds includes the frequency outside of the predetermined threshold, each of the first audio module (not shown) and the second audio module 532 are configured to transmit a notification to the user 526 via the first in-ear device 518A and the second in-ear device 518B, respectively, that one or more of the one or more sounds includes the frequency outside of the predetermined threshold.

Figure 20:
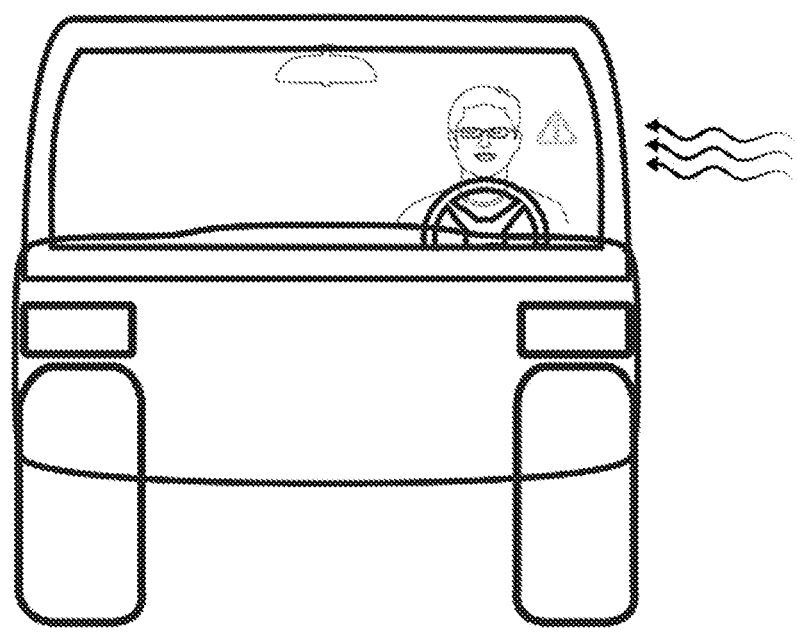
FIG. 20 depicts a vehicle driver experiencing unbalanced noise exposure from an open left window, prompting an alert by the smart sunglasses of impending left-ear damage.

An exemplary usage scenario is illustrated in FIG. 20, in which a vehicle driver wearing smart glasses is experiencing unbalanced noise exposure from an open left window. That is, the driver's right ear's potential exposure to noise in the vehicle cabin is generally far quieter than their left ear's potential exposure to noise from the open window, Thus, a loud noise from the outside, such as noise from construction equipment, wind, an accident, a siren, or the like may impact the driver's left ear far more than their right ear. In this scenario, a sonic transducer operatively coupled to the smart glasses and having an input near the left ear, may be able to detect a dangerously high noise level impinging on the left ear, while another transducer with an input similarly disposed near the right ear may not. In response, a processor within or operatively coupled to the transducer may generate an alert of possible or probable risk of left-ear damage (e.g. via the smart glasses and/or car display unit and/or seat by vibration, beep, or display notification). This may give the wearer of the smart glasses an opportunity to take action to mitigate the harmful noise, such as by closing the open window, or covering their left ear with their hand, for example.

In embodiments, the smart glasses may additionally or alternatively be configured to include, or may be operatively coupled to, a module for light sensing and promoting eye health, with a light transducer having an input at or near the position of the wearer's eyes. This may guard against eye strain from light impinging on the wearer's eyes, either within or beyond the visible range, by continuously monitoring and measuring light of one or more default or select frequencies or frequency ranges. For example, the intensity of blue light impinging on the wearer's eyes from viewing a digital screen or other light emitting device may have an undesired effect on the wearer's eyes, or caused by the wearer's eyes (e.g., upon the brain), such as sleep-related issues. The smart glasses may include or be operatively coupled to a processor that may, responsive to detecting a possibly harmful amount of light impinging on the wearer's eyes, notify the wearer (e.g. via vibration, beep, or display notification). This may induce them to shift their eyes away from, filter with dark or polarized lenses, or otherwise mitigate, the harmful light. In an embodiment, the notification may include information of, or a recommendation regarding, the harmful light, such as specifying a time period to avoid, or to limit exposure to, the harmful light. In an embodiment, the processor may be operatively coupled to an artificial source of the harmful light, such as a light emitting diode (LED) display for example, and may autonomously alter the display outputs. Studies indicate the best way to protect eyes from harm due to viewing blue light generated by a source of blue light (e.g. a device display) is to reduce the time spent viewing the blue light source, and not to simply filter out the blue light. A warning may provide this information to the wearer.

In another currently preferred embodiment, the smart glasses may be configured to include, or may be operatively coupled to, a module for sound sensing and promoting hearing health, with a sound transducer having an input at or near the position of the wearer's ears. This may guard against loss of hearing from sounds impinging on the wearer's ears within or beyond the hearing frequency range, by continuously monitoring and measuring sounds of one or more select frequencies or frequency ranges. The glasses may include or be operatively coupled to a processor that may, responsive to detecting a possibly harmful amount of sound impinging on the wearer's ears, notify a user (e.g. via vibration, beep, or display notification). This may induce them to wear ear protection, or otherwise mitigate, the harmful sound. In an embodiment, the notification may include information of, or a recommendation regarding, the harmful sound. In an embodiment, the processor may be operatively coupled to a controllable source of the harmful sound, such as a speaker in an automobile coupled to a head unit, and may autonomously alter the speaker outputs.

Further, the sound module may be designed to provide one or more of the following capabilities, including by implementing frequency isolation and filtering.

It is known that extensive use of in-ear devices can disrupt or distort a human's ordinary auditory perception. In embodiments, if the sound module senses an audio stream that may be causing harm, it may be configured to cause attached ear bud speakers or the like of the module to go into an auto-off mode, and the audio stream may be continued via sound module speakers (on smartglasses frame) or on surrounding external audio outputs. See, e.g., FIGS. 11, 12, the speakers of which may both be included in a single embodiment.

A sound module with an audio input (e.g. mic, vibration sensor) placed above each ear may approximate how a user hears; the inputs may work together to calculate the approximate spatial direction of a noise source. This functionality may be used to address the issue of asymmetric hearing loss. For instance, truck drivers may suffer from asymmetric hearing loss due to unbalanced noise exposure from an open windows driver side window while driving. In the event a truck driver in the U.S. consistently has their left window open, the module may in real-time detect the direction of the noise origin (map it to the left or right ear), and notify the truck driver of impending left-ear damage. See FIG. 20.

The herein disclosed smart glasses may be configured and programmed to detect certain discrete sound patterns, and autonomously respond to a detected pattern. For example, loud noise sources with rapid changes in sound (like jack hammers) and sources with prolonged tones (like sirens), are distinct with regard to hearing loss (more specifically, conductive hearing loss). At similar signal intensities, one sound pattern may do more harm to a person's hearing than another. The herein disclosed smart glasses may be configured to differentiate between various sound patterns and autonomously act to mitigate potentially harmful sounds and/or warn users accordingly.

Studies also show that high-pitched sounds and sounds at certain frequencies may damage the auditory nerve and contribute to sensorineural hearing loss, which is irreparable. In order to prevent sensorineural hearing loss, the herein disclosed smart glasses software may isolate and monitor audio streams at predetermined or selected potentially harmful frequencies, and/or above a predetermined or select threshold frequency. When these are detected, the smart glasses may autonomously act to warn users, and/or modify or remove noise of a specific frequency or higher than a threshold frequency from audio output(s).

Music or sounds at certain frequencies can cause tinnitus symptoms, or cause tinnitus symptoms to worsen. In embodiments, smart glasses may incorporate tinnitus-related frequency information from the user. The smart glasses may filter sounds of such frequencies to remove, or otherwise mitigate, said frequencies from in-ear or surrounding audio outputs.

In embodiments, a connector may be included in the smart glasses (e.g., a USB-C or other connector). The connector may be used to couple the smart glasses to another device, and to communicate with the device, to receive inputs from and/or to output control signals to the coupled device. For example, an augmented reality (AR) or other heads-up display may be coupled to the smart glasses. Plug and Play connectivity may be used in conjunction with coupling the smart glasses to the other device.

Other embodiments may be configured to modify sound, light, and/or other electro-magnetic inputs to promote the user's health with regard to the following issues.

Absorbed radiation from some electronic devices may increase tumor occurrence and/or excessively heat various tissues within the body. The herein disclosed smart glasses may be configured to interface with and control devices emitting the radiation to reduce the incidence of such tumors.

Infrasonic waves produced by machines like windmills may cause headaches and nervousness; and ultrasonic sources with high-intensity and focused beams may cause headaches and dizziness. Properly configured smart glasses as disclosed herein may counter these effects by interfacing with and controlling the sources of infrasonic and ultrasonic sound. Alternatively, the glasses may interface with and control complementary sound sources to emit sound that cancels at least some of the harmful infrasonic and ultrasonic sound.

Thus, the flexible architecture of the disclosed smart glasses may allow the smart glasses to be configured, arranged, and/or programmed to provide these and other benefits for mitigating harmful effects of EMF, infrasonic and ultrasonic sources in various scenarios.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made, and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

What is claimed is:

1. Smart glasses, comprising:
   a frame;
   at least one signal input device coupled to the frame;
   at least one signal output device coupled to the frame;
   a computing processor operatively coupled to the signal input device and the signal output device;
   a memory containing computer-executable instructions operatively coupled to the processor to process an input signal received by the signal input device and generate an output signal and send it to the signal output device, wherein the input signal is processed to determine if there is a risk of harm from the input signal to a wearer of the smart glasses, and in the case it is determined there is a risk of harm the generated output signal is customized to mitigate the risk caused by the input signal;
   at least one power source coupled to the signal input device, the signal output device, the processor, and the memory; and
   a filter for filtering the output signal before it is sent to the output device;
   wherein the filter comprises one of a notch filter, a band-pass filter, and a low-pass filter; and
   wherein the filter is realized by the processor, including calculating a Fast Fourier Transform (FFT) of the input signal to convert it to a frequency domain and measuring amplitudes of frequencies found in the input signal.

2. The smart glasses of claim 1, wherein the input signal is one of a sound wave and an electro-magnetic (em) wave.

3. The smart glasses of claim 1, wherein the input device includes at least one microphone, and the output device includes at least one speaker.

4. The smart glasses of claim 3, wherein at least one first speaker coupled to the glasses is disabled and at least one second speaker disposed at a different position than the first speaker is enabled.

5. The smart glasses of claim 4, wherein the second speaker is physically coupled to the glasses.

6. The smart glasses of claim 4, wherein the second speaker is not physically coupled to the glasses.

7. The smart glasses of claim 3, wherein the at least one speaker includes a first speaker proximate the left ear of the wearer and a second speaker proximate the right ear of the wearer.

8. The smart glasses of claim 7, wherein the output signal sent to the first speaker and the output signal sent to the second speaker are individually customized to mitigate the risk of harm to the wearer's left ear or right ear, respectively, or both.

9. The smart glasses of claim 1, further comprising a transmitter to send control signals generated by the processor to an external signal output device.

10. The smart glasses of claim 1, wherein the smart glasses are configured to send a notification to the wearer responsive to the processing of the input signal determining there is a risk of harm from the input signal to the wearer of the smart glasses.

11. The smart glasses of claim 10, wherein the notification includes at least one of a haptic output, an auditory output, and a visual output.

12. The smart glasses of claim 11, wherein the notification includes at least one of information regarding and a recommendation regarding, the determined risk of harm from the input signal.

13. The smart glasses of claim 1, further comprising a connector to couple another device to the smart glasses and to communicate with the device to receive an input from the coupled device, to output a control signal to the coupled device, or both.

14. Smart glasses, comprising:
a frame;
at least one signal input device coupled to the frame;
at least one signal output device coupled to the frame;
a computing processor operatively coupled to the signal input device and the signal output device;
a memory containing computer-executable instructions operatively coupled to the processor to process an input signal received by the signal input device and generate an output signal and send it to the signal output device, wherein the input signal is processed to determine if there is a risk of harm from the input signal to a wearer of the smart glasses, and in the case it is determined there is a risk of harm the generated output signal is customized to mitigate the risk caused by the input signal;
at least one power source coupled to the signal input device, the signal output device, the processor, and the memory;
wherein the input device includes at least one electro-magnetic (em) radiation sensor disposed proximate the wearer's eyes, and the output device includes at least one em radiation modifying element;
wherein the em radiation is in a cellular communication frequency range and the output device includes at least one antenna; and
wherein the em radiation emitted by the at least one antenna is configured to mitigate the cellular signal impinging on the wearer's brain.

15. The smart glasses of claim 14, wherein the em radiation is in the visible frequency range and the output device includes at least one filter.

16. The smart glasses of claim 14, wherein the input signal is one of a sound wave and an electro-magnetic (em) wave.

17. The smart glasses of claim 14, wherein the input device includes at least one microphone and the output device includes at least one speaker.

18. The smart glasses of claim 17, wherein the at least one speaker includes a first speaker proximate the left ear of the wearer and a second speaker proximate the right ear of the wearer.

19. Smart glasses, comprising:
a frame;
at least one signal input device coupled to the frame;
at least one signal output device coupled to the frame;
a computing processor operatively coupled to the signal input device and the signal output device;
a memory containing computer-executable instructions operatively coupled to the processor to process an input signal received by the signal input device and generate an output signal and send it to the signal output device, wherein the input signal is processed to determine if there is a risk of harm from the input signal to a wearer of the smart glasses, and in the case it is determined there is a risk of harm the generated output signal is customized to mitigate the risk caused by the input signal;
at least one power source coupled to the signal input device, the signal output device, the processor, and the memory; and
wherein the memory further contains information pertaining to a known deficiency of the wearer's sensory faculties with regard to the input signal, and the computer-executable instructions include instructions to process the input signal to determine if the deficiency of the sensory faculties can be mitigated by modifying the output signal, and in the case it is determined the deficiency can be mitigated, the generated output signal is modified to mitigate the deficiency.

20. The smart glasses of claim 19, wherein the input signal is one of a sound wave and an electro-magnetic (em) wave.

21. The smart glasses of claim 19, wherein the input device includes at least one microphone, and the output device includes at least one speaker.

* * * * *